(12) United States Patent
Nosaka et al.

(10) Patent No.: US 7,993,228 B2
(45) Date of Patent: Aug. 9, 2011

(54) POWER TRANSMISSION DEVICE

(75) Inventors: Michiyasu Nosaka, Anjo (JP); Yasuo Tabuchi, Toyoake (JP); Motohiko Ueda, Okazaki (JP); Yoshiki Tada, Okazaki (JP); Hiroshi Nagae, Toyohashi (JP); Masahiro Yamashita, Hamamatsu (JP); Kouji Kida, Tahara (JP); Mitsuhiro Tanabe, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 731 days.

(21) Appl. No.: 11/251,844

(22) Filed: Oct. 18, 2005

(65) Prior Publication Data
US 2006/0084541 A1 Apr. 20, 2006

(30) Foreign Application Priority Data

Oct. 19, 2004 (JP) ................. 2004-304272
Dec. 24, 2004 (JP) ................. 2004-372961
Feb. 8, 2005 (JP) ................. 2005-031579
Feb. 18, 2005 (JP) ................. 2005-042611
Mar. 11, 2005 (JP) ................. 2005-069316

(51) Int. Cl.
*F16H 55/36* (2006.01)
*F16D 3/00* (2006.01)

(52) U.S. Cl. .......... 474/170; 474/70; 474/199; 474/161; 474/94

(58) Field of Classification Search .................. 474/70, 474/94, 161, 170, 199, 902; 464/30, 89
See application file for complete search history.

(56) References Cited

U.S. PATENT DOCUMENTS

| | | | | |
|---|---|---|---|---|
| 3,362,191 A | * | 1/1968 | Luette | 464/49 |
| 4,653,165 A | * | 3/1987 | Ishii et al. | 29/892.3 |
| 4,717,370 A | * | 1/1988 | Rohrig | 474/161 |
| 5,564,981 A | * | 10/1996 | Iwabuchi et al. | 464/73 |
| 5,899,811 A | * | 5/1999 | Kishibuchi et al. | 464/30 |
| 6,120,257 A | | 9/2000 | Saiki et al. | |
| 6,183,230 B1 | * | 2/2001 | Beardmore et al. | 418/171 |
| 6,425,837 B1 | * | 7/2002 | Ochiai | 474/70 |
| 7,244,185 B2 | | 7/2007 | Kamdem et al. | |
| 2003/0186749 A1 | * | 10/2003 | Hauck | 464/75 |
| 2003/0199348 A1 | | 10/2003 | Huber | |

(Continued)

FOREIGN PATENT DOCUMENTS

EP 0 793 031 9/1987

(Continued)

OTHER PUBLICATIONS

Office Action dated Dec. 9, 2008 in corresponding Japanese Patent Application No. 2005-031579 (and English Translation).
Preliminary Search Report dated Jun. 4, 2008 in corresponding French Patent Application No. 05 10666 (and English translation).

(Continued)

*Primary Examiner* — Michael R Mansen
*Assistant Examiner* — Robert T Reese
(74) *Attorney, Agent, or Firm* — Posz Law Group, PLC

(57) ABSTRACT

A power transmission device includes a pulley 1 and a hub 2 having an inner hub 21, a rubber damper 22 and an outer hub 23. A hub side engagement portion 24 formed of an elastic material and arranged either one, or both, of inner peripheral surface and outer peripheral surface of the outer hub engages with a pulley side engagement portion 12, arranged at a position corresponding to the outer hub, of the pulley in concavo-convex fitting to thereby constitute a torque transmission structure between the hub and the pulley. The hub side engagement portion and the pulley side engagement portion have a concavo-convex outer shape and mesh with each other.

29 Claims, 22 Drawing Sheets

U.S. PATENT DOCUMENTS

2004/0067807 A1* 4/2004 Shibata et al. .............. 474/161

FOREIGN PATENT DOCUMENTS

| EP | 0 916 863 A1 | 5/1999 |
|---|---|---|
| FR | 2 853 372 | 10/2004 |
| FR | 2 853 373 | 10/2004 |
| GB | 1 077 601 | 8/1967 |
| JP | A-09-292003 | 11/1997 |
| JP | A-10-311399 | 11/1998 |
| JP | A-11-148519 | 6/1999 |
| JP | A-2001-153152 | 6/2001 |
| JP | A-2002-276777 | 9/2002 |
| JP | A-2002-364667 | 12/2002 |
| JP | A-2003-56595 | 2/2003 |

OTHER PUBLICATIONS

Notice of Reasons for Rejection mailed on May 12, 2009 issued from the Japanese Patent Office in the corresponding Japanese patent application No. 2005-069316 (and English translation).

* cited by examiner

FRONT SIDE ←——→ REAR SIDE

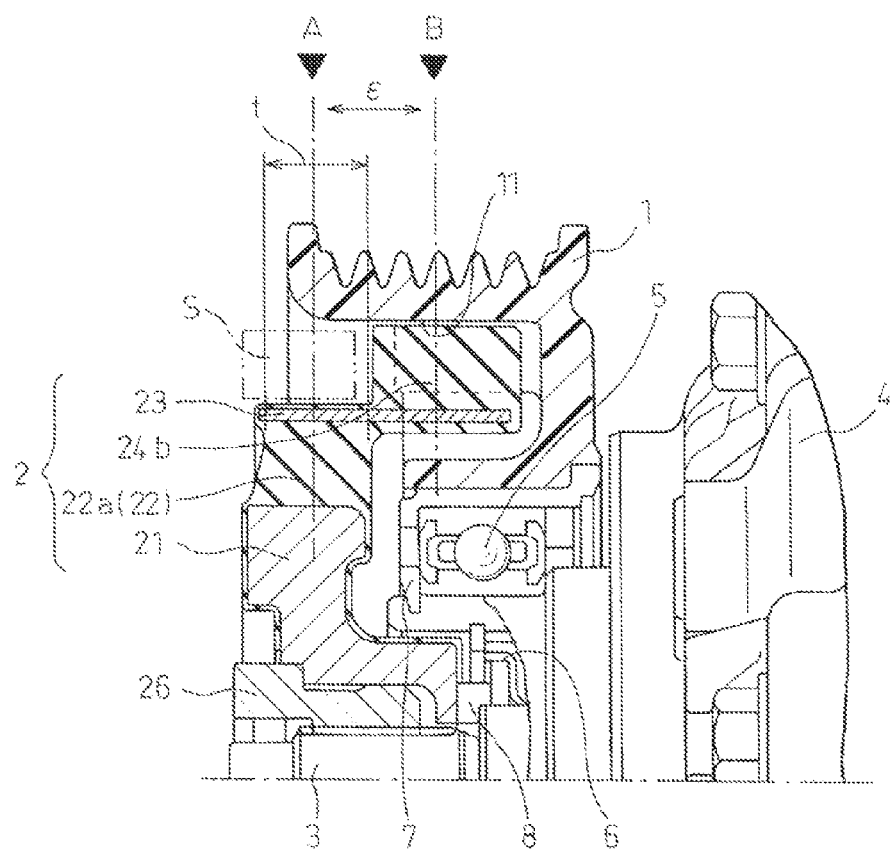

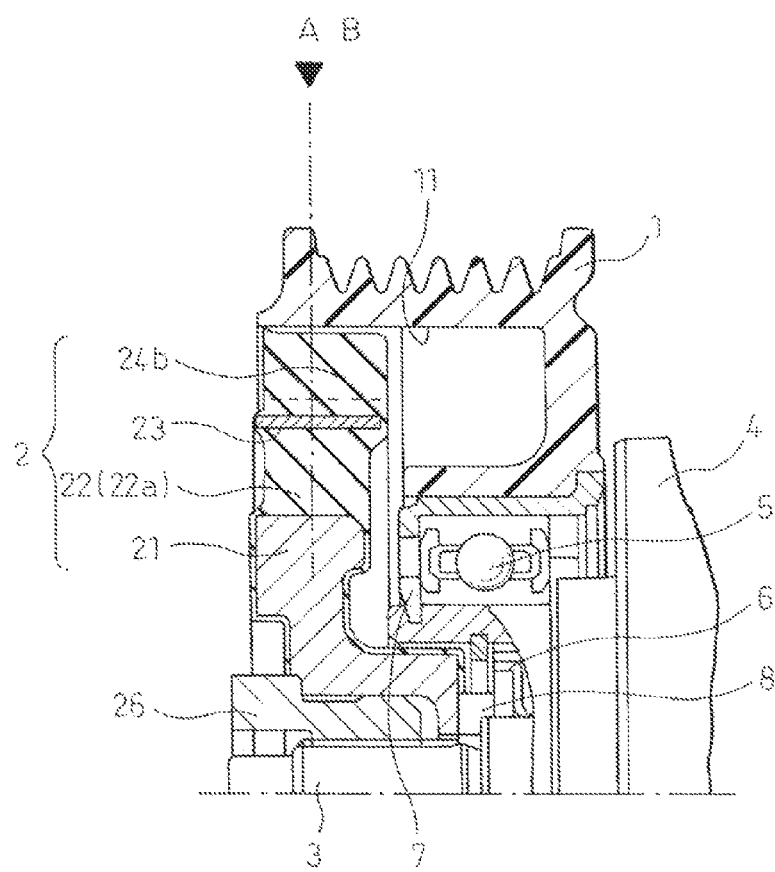

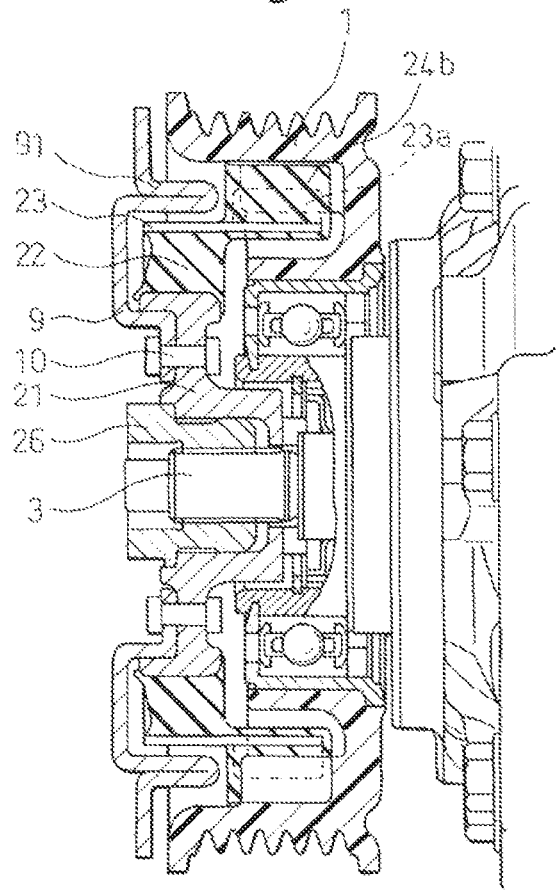

Fig. 13A
Fig. 13B
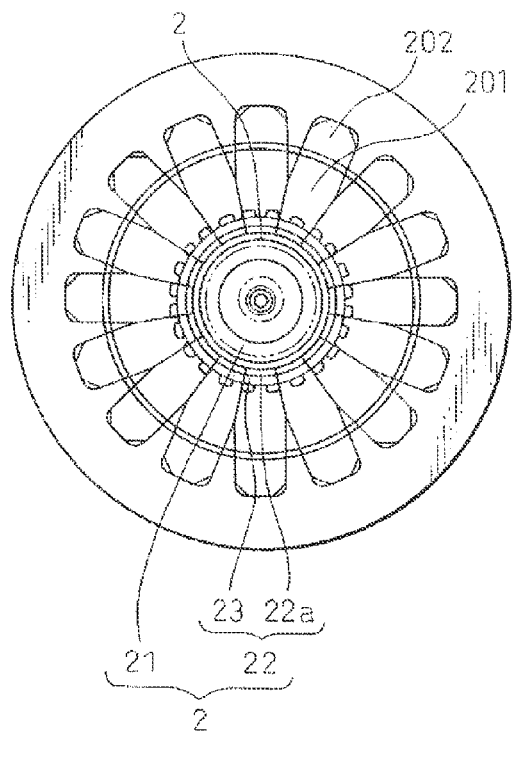
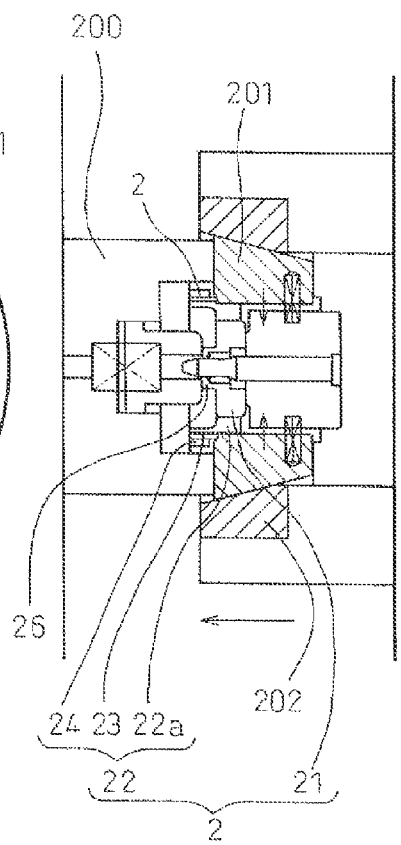

POWER TRANSMISSION DEVICE

BACKGROUND OF THE INVENTION

1. Field of the Invention

This invention relates to a power transmission device having the function of a torque limiter. More particularly, the invention relates to a power transmission device that is used when assembled into a car compressor.

2. Description of the Related Art

In a power transmission device for transmitting power to a compressor in the prior art, a coupling method of a hub having a damper attenuation mechanism made of a material such as rubber and a pulley has been conducted by a method shown in FIGS. 27A and 27B. In other words, when a pulley A is made of a metal such as iron, a screw thread is formed on the pulley A and the pulley A and a hub B are coupled by a bolt C, or the like (refer to Japanese Unexamined Patent Publication No. 2001-153152). Incidentally, symbol D represents a rubber damper.

In the case of a pulley A made of a material having a relatively low material strength, compared to metal, such as a resin, a metal E capable of screw meshing is coupled with the pulley A by a method such as insert molding, and then the bolt C, or the like, is used to thereby couple the hub B and the pulley A (refer to Japanese Unexamined Patent Publication No. 2003-56595).

However, a component such as a metal fitting for screwing with the bolt must be added in the coupling method shown in FIG. 27B and the production cost increases. In the case of a pulley made of a resin material, for example, the metal fitting must be disposed by means such as insert molding. In addition, the problem remains that the coupling strength between the metal fitting and the resin material remarkably drops owing to a change of the resin material with time.

A reinforcing material, such as glass fibers, is incorporated in the resin to improve the material strength in the case of the resin pulley. However, the orientation of the glass fibers cannot easily be made the desired orientation by insert molding of the metal fitting, so that a good coupling strength cannot be acquired around the metal fitting.

Therefore, the prior art technology employs the construction in which a convex portion B1 is formed around an outer ring of the hub B, a concave portion A1 is formed around the inner circumference of the resin pulley A and they are fitted to each other as shown in FIG. 27C (refer to Japanese Unexamined Patent Publication No. 2002-364667) so that the bolt or the like is not necessary when the hub B and the pulley A are fitted to each other.

According to this prior art technology, however, the convex portion of the outer ring and the concave portion of the pulley come into direct contact with each other due to excessive torque or a torque fluctuation, and the concave portion of the resin pulley having lower strength and wear resistance than the outer ring is abnormally worn out.

SUMMARY OF THE INVENTION

In view of the problems of the prior art described above, the invention is directed to provide a power transmission device that does not need bolts and insert metal fittings, can prevent abnormal wear of a resin pulley and can provide a high strength coupling structure of a pulley and a hub.

It is an object of the invention to provide a power transmission device capable of preventing invasion of foreign matters to a fitting portion between a pulley and a hub and preventing abnormal wear, etc, of this fitting portion.

The power transmission device according to the invention includes a pulley 1 and a hub 2 including an inner hub 21, an outer hub 23 and a torque transmitting elastic member 22, wherein a hub side engagement portion 24 formed of an elastic material and disposed on either one, or both, of an inner peripheral surface side and an outer peripheral surface side of the outer hub 23 and a pulley side engagement portion 12 disposed at a position corresponding to the outer hub 23 of the pulley 1 engage with each other to thereby form a torque transmission structure between the hub 2 and the pulley 1.

Accordingly, a high strength coupling can be obtained without requiring bolts and insert metal fittings.

In the power transmission device according to the invention, the pulley 1 is formed of a resin material. Even when the pulley 1 is formed of the resin material in this way, in the invention, abnormal wear of the pulley 1 can be prevented because the hub side engagement portion 24 is formed of an elastic material.

In the power transmission device according to the invention, the hub side engagement portion 24 and the pulley side engagement portion 12 have a fitting structure. Therefore, they can be tightly fitted and coupled without using bolts, or the like.

In the power transmission device according to the invention, the hub side engagement portion 24 is arranged on the outer hub 23 by integral molding or bonding. In other words, the outer hub 23 and the hub side engagement portion 24 may be integrally molded by insert molding or the hub side engagement portion 24 may be bonded to the outer hub 23 by bonding.

In the power transmission device according to the invention, the hub side engagement portion 24 constitutes a part of the torque transmitting elastic member 22. Consequently, the number of components can be decreased.

In the power transmission device according to the invention, the hub side engagement portion 24 and a rear side portion of the outer hub 23 have a plurality of slits 25 formed with gaps among them in a circumferential direction. Consequently, when the pulley is formed of a material having a relatively lower strength, than a metal pulley, such as a resin, for example, reinforcing portions (ribs) are sometimes necessary for securing the strength. In such a case, when the hub side engagement portion 24 is shaped into a complete circular shape, the ribs of the resin pulley and the hub side engagement portion 24 interfere with one another and assembly cannot be done in some cases. This problem of assembly can be avoided by forming slits 25 at the hub side engagement portion 24 and the rear portion of the outer hub 23.

In the power transmission device according to the invention, at least one of the first or second hub side engagement portion 24a, 24b of the hub side engagement portion 24 and an inside or outside surface 11a, 11b of a concave portion 11 of the pulley 1 is formed into a substantial taper shape. In this way, the assembly property between the hub 2 and the pulley 1 can be improved.

In the power transmission device according to the invention, the outer hub 23 is an outer ring 23 separate from the hub side engagement portion 24.

In the power transmission device according to the invention, an entire surface of the outer ring as the outer hub 23 is covered with an elastic material such as rubber or a resin forming the torque transmitting elastic member 22 or the hub side engagement portion 24. Consequently, the outer ring does not have any portion that is exposed to the outside, painting, etc, need not be applied, and the effect of the corrosion resistance and the effect of preventing from dazzling and furthermore, the effect of the appearance, can be improved. As the coating step can be eliminated, the environment of a factory can be improved and, as the setup for the coating step is unnecessary, the cost can be decreased.

In the power transmission device according to the invention, a reinforcing portion 23a protruding inside the hub side engagement portion 24 is arranged on the outer ring 23 as the outer hub. The strength of the concavo-convex portion of the hub side engagement portion 24 having the concavo-convex shape can be improved.

In the power transmission device according to the invention, the outer ring 23 is formed of a metal. Therefore, the strength of the outer hub 23 can be improved.

In the power transmission device according to the invention, the hub side engagement portion 24 is more offset, towards a root side of the rotary shaft 3, in comparison with the torque transmitting elastic member 22, and the metal outer ring 23 is so formed as to be pushed from a diametric direction. Consequently, a space S for pushing the metal outer ring 23 disposed around the outer periphery of the torque transmitting elastic member 22 from a diametric direction can be secured, the pushing step can be added to the torque transmitting elastic member 22 and the durability of the elastic member 22 can be secured.

In the power transmission device according to the invention, the hub side engagement portion 24 is more offset, towards a root side of the rotary shaft 3, in comparison with the torque transmitting elastic member 22, and a balancer weight 9 fitted to the inner hub 21 or to the rotary shaft 3 is arranged on the front side of the hub side engagement portion 24. The balancer weight 9 can be arranged in the space S formed by this offset, and a power transmission device having low noise and low vibration can be provided.

In the power transmission device according to the invention, a maximum width HW of each convex portion 241 of the hub side engagement portion 24 is set to be at least equal to or more than a maximum width PW of each convex portion 121 of the pulley side engagement portion 12. Consequently, the strength of each convex portion 241 of the hub side engagement portion 24 can be improved and abnormal wear of the hub side engagement portion 24 and destruction of the convex portion 241 can be prevented.

In the power transmission device according to the invention, a gap g of at least equal to or not less than 0.001 mm is disposed between a distal end portion 241a of the convex portion 241 of the hub side engagement portion 24 and a bottom portion of the concave portion 122 of the pulley side engagement portion 12. Consequently, it is possible to prevent the wear that occurs when the distal end portion 241a of the convex portion 241 of the hub side engagement portion 24 formed of the elastic member comes into contact with the pulley side engagement portion 12 and slides.

In the power transmission device according to the invention, an R1 portion 242d and an R2 portion 242e are formed on both sides of the bottom portion 242a of the concave portion 242 of the hub side engagement portion 24, and the R1 portion 242d on the side of a rotating direction has an R shape having a greater diameter than the R2 portion 242e on the side of a counter-rotating direction. Consequently, it is possible to mitigate the tensile stress S occurring at the root of the convex portion 241 of the hub side engagement portion 24 resulting from the excessive torque, to prevent breakage of the convex portion 241 and to improve the durability of the power transmission device.

In the power transmission device according to the invention, the side surface of each convex portion 241 of the hub side engagement portion 24 and the side surface of each concave portion 122 of the pulley side engagement portion 12 keep mutual contact and form a torque transmission surface TF, and this torque transmission surface TF is arranged on a normal NL of the pulley 1. It is therefore possible to prevent minute slip at the concavo-convex fitting portion during torque transmission between the hub side engagement portion 24 and the pulley side engagement portion 12.

In the power transmission device according to the invention, the torque transmission surface TF is deviated by a predetermined angle from the normal NL in the rotating direction of the pulley 1. According to this arrangement, too, the occurrence of the minute slip during torque transmission can be sufficiently avoided.

In the power transmission device according to the invention, the side surface of each convex portion 121 of the pulley side engagement portion 12 and the side surface of each concave portion 242 of the hub side engagement portion 24 keep mutual contact and form a torque transmission surface TF, and the torque transmission surface TF on the rotating side of each convex portion 121 of the pulley side engagement portion 12 and the torque transmission surface TF on the side of the counter-rotating direction are substantially parallel to each other. In this case, too, the occurrence of the minute slip during torque transmission can be avoided.

In the power transmission device according to the invention, a material having a low coefficient of friction is disposed on the surface of the hub side engagement portion 24 by bonding, coating or surface treatment. Consequently, the wear resistance of the hub side engagement portion 24 can be improved and a power transmission device having long life can be provided.

In the invention, the hub side engagement portion 24 formed at a part of a torque transmitting elastic member 22 and the pulley side engagement portion 12 formed on a pulley 1 fit to each other in concavo-convex engagement and form a concavo-convex fitting portion, and a ring-like dust invasion prevention portion 28 is so arranged as to cover a front surface of the concavo-convex fitting portion. Consequently, invasion of foreign matters such as dust and liquid into the concavo-convex fitting portion can be prevented and abnormal wear of the concavo-convex fitting portion can be prevented. Because the dust invasion prevention portion 28 is disposed, a deflashing work of the hub side engagement portion 24 becomes easy, the number of man-hour can be reduced and the increase of the cost of production can be suppressed.

In the invention, a part of the torque transmitting elastic member 22 is so arranged as to wrap a rear side portion of the outer hub 23 and its outer surface is formed into a concavo-convex shape to thereby form the hub side engagement portion 24. According to this construction, the strength of the hub side engagement portion 24 can be improved because a part of the outer hub 23 is inserted as a core member into the hub side engagement portion 24.

In the invention, the dust invasion prevention portion 28 is formed integrally with the torque transmitting elastic member 22. Consequently, invasion of foreign matters and liquid can be completely checked.

In the invention, the dust invasion prevention portion 28 is arranged on the side of the torque transmitting elastic member 22 and a small clearance g is disposed between the dust invasion prevention portion 28 and the pulley 1. In this case, too, invasion of foreign matters can be sufficiently prevented to a certain extent.

In the invention, the dust invasion prevention portion 28 is disposed on the side of the pulley and a small clearance g is disposed between the torque transmitting elastic member 22 and the dust invasion prevention portion 28.

In the invention, a plurality of slits 25 is formed at intervals among them on the hub side engagement portion 24 in a circumferential direction. When the pulley is formed of a material having a relatively lower strength such as a resin than a metallic pulley, for example, reinforcing portions (ribs) are sometimes necessary to secure the strength. In such a case, if the hub side engagement portion 24 is formed into a complete ring-like shape, the ribs of the resin pulley are likely to interfere with the hub side engagement portion 24, so that the hub 2 cannot be assembled to the pulley 1 in some cases. When the slits 25 are formed on the hub side engagement portion 24 and at the rear side portion of the outer hub 23, the problem of assembly can be avoided.

The present invention may be more fully understood from the description of preferred embodiments of the invention, as set forth below, together with the accompanying drawings.

BRIEF DESCRIPTION OF THE DRAWINGS

In the drawings:

FIG. 10 is an upper half front view of a power transmission device in a fifth embodiment;

FIG. 11 is an upper half front view showing another embodiment for comparison with the fifth embodiment;

FIG. 12 is a sectional view of a power transmission device of a sixth embodiment;

FIG. 13A is a front view and FIG. 13 B is a sectional view showing an example of a drawing step.

FIGS. 27A to 27C are sectional views of three prior art technologies.

DESCRIPTION OF THE PREFERRED EMBODIMENTS

Figure 1:
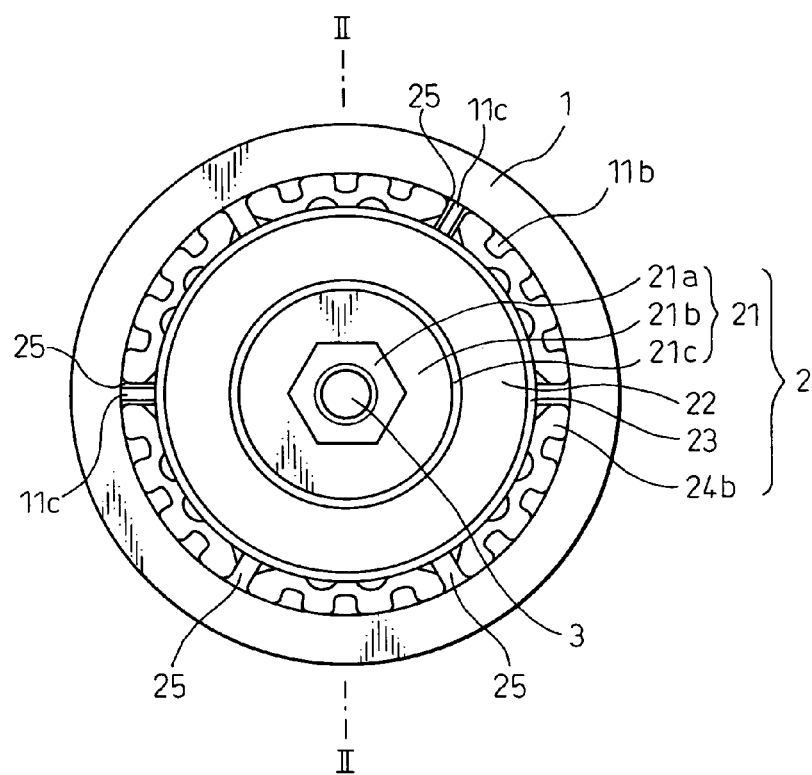
FIG. 1 is a front view of a power transmission device according to a first embodiment of the invention.
Figure 2:
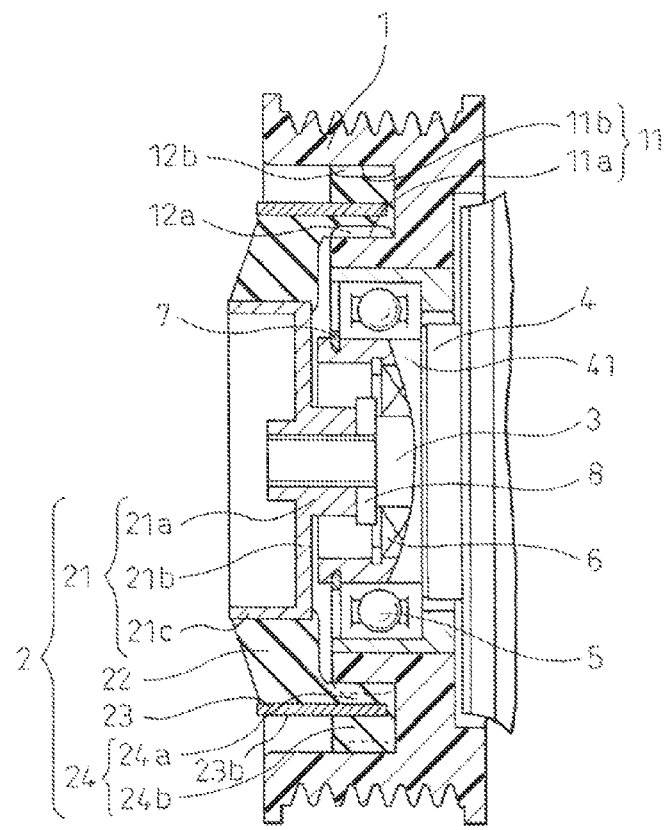
FIG. 2 is a sectional view taken along a line II-II in FIG. 1.

Power transmission devices according to the preferred embodiments of the invention will be hereinafter explained with reference to the accompanying drawings. The power transmission device of the invention is suitably assembled to a compressor of a car air conditioner. FIG. 1 is a front view of a power transmission device according to a first embodiment of the invention and FIG. 2 is a sectional view taken along a line II-II in FIG. 1. The power transmission device of this invention transmits power (torque) between a pulley 1 as a driving side rotary member for acquiring power from an engine and a motor and a hub 2 as a driven side rotary member fixed to a rotary shaft 3 of the compressor. The pulley 1 and the hub 2 are arranged on the same axis.

The pulley 1 is rotatably fitted to a cylindrical portion 41 formed at one of the ends of a housing 4 of the compressor through a bearing 5. The pulley 1 is appropriately molded from a thermoplastic synthetic resin but may be formed of a metal such as iron. When the pulley 1 is formed of the resin, the pulley 1 and the bearing 5 are ordinarily integrated by insert molding. A belt (not shown in the drawing) is wound on the outer peripheral surface of the pulley 1 and is rotated by external power of an engine or a motor. The bearing 5 is fitted into the cylindrical portion 41 and its movement in an axial direction is prevented by a snap ring 7 fitted into a groove that is formed in the outer peripheral surface of the cylindrical portion 41. The housing 4 and the rotary shaft 3 are sealed by a seal device 6 to prevent leak of a refrigerant and an oil.

A distal end portion 31 of the rotary shaft 3 of the compressor protrudes from the housing 4 and a screw portion is formed on the outer peripheral surface of the distal end portion 31. The cylindrical hub 2 is meshed with and fixed to the distal end portion 31. Incidentally, other fixing methods can be suitably employed to fix the hub 2 to the rotary shaft 3 such as spline fitting, fitting by a bolt, and so forth. Incidentally, reference numeral 8 denotes a washer.

The hub 2 includes an inner hub 21, a damper rubber 22 as a torque transmitting elastic member, an outer hub 23 and a hub side engagement portion 24.

The inner hub 21 has a cylindrical portion 21a meshing with the distal end portion 31 of the rotary shaft 31, a cylindrical flange portion 21c protruding towards the front (to the left in FIG. 2) and bonded on its outer peripheral surface to the damper rubber 22 and a disc-like intermediate portion 21b for connecting the cylindrical portion 21 and the flange portion 21c. A screw portion is formed on the inner peripheral surface of the cylindrical portion 21a. The inner hub 21 is formed of a metal material such as iron.

The outer hub 23 has a cylindrical shape and is formed of a metal material such as iron in the same way as the inner hub 21.

The ring-like damper rubber 22 as the torque transmitting elastic member is formed of an elastic material such as rubber, is arranged and held between the inner hub 21 and the outer hub 23 and is bonded to the outer peripheral surface of the flange portion 21c of the inner hub 21 and to the inner peripheral surface of the outer hub 23 by means such as bonding with adhesive. The damper rubber 22 operates not only as the torque transmitting elastic member but also as a torque damper.

A first hub side engagement portion 24a is formed on the inner peripheral surface of the outer hub 23 on the rear side (right side in FIG. 2) and a second hub side engagement portion is so formed as to extend over substantially the entire periphery of the outer hub 23. The first and second hub side engagement portions 24a and 24b are formed of an elastic material such as rubber or resin and their outer shape has a concavo-convex shape such as an involute-spline shape or a trochoidal shape. These first and second hub side engagement portions 24a and 24b are bonded to the respective surfaces of the outer hub 23 by bonding or are integrally formed with the outer hub 23 by insert molding. Incidentally, the hub side engagement portion 24 may be arranged on the inner peripheral surface or the outer peripheral surface of the outer hub 23. Alternatively, it is possible to integrate the first and second hub side engagement portions 24a and 24b with the rubber damper 22 in such a fashion that the first and second hub side engagement portions 24a and 24b embrace the rear side portion of the outer hub 23 as shown in FIG. 2.

On the other hand, a ring-like concave portion 11, or annular concavity, is formed in the surface on the front side to accept the hub side engagement portion 24 in the pulley 1, too. First and second pulley side engagement portions 12a and 12b having a concavo-convex shape such as an involute-spline shape or a trochoidal shape are bonded by means such as bonding to inner and outer surfaces 11a and 11b of this ring-like concave portion 11. It is also possible to bond the pulley side engagement portion 12 to either the inner surface 11a or the outer surface 11b of the ring-like concave portion 11. The first and second pulley side engagement portions 12a and 12b, too, are formed of an elastic material such as rubber or resin.

When the hub side engagement portion 24 is fitted into the ring-like concave portion 11 (pulley side engagement portion 12) in this way, the first hub side engagement portion 24a meshes with the first pulley side engagement portion 12a and the second hub side engagement portion 24b meshes with the second pulley side engagement portion 12b, so that the hub 2 and the pulley 1 are interconnected to each other.

As described above, coupling between the hub 2 and the pulley 1 in this embodiment is achieved by fitting the hub side engagement portion 24 formed on the hub 2 to the pulley side engagement portion 12 formed on the pulley 1 and causing them to engage with each other in the concavo-convex form through their outer shapes. Therefore, it is possible to provide a power transmission structure allowing high transmission force without requiring a bolt, or the like.

Even when the pulley 1 is formed of a material having a relatively low strength such as a resin, an economical power transmission structure can be accomplished without requiring insert molding of metal fittings, or the like. Because insert molding is not necessary, deterioration of the flow of a strength improving material (glass fiber, etc) in insert molding can be avoided and the improvement of the strength of the pulley can be achieved as desired.

Furthermore, because the engagement portion formed of the elastic material is provided to the outer hub, abnormal wear at the fitting portion resulting from the differences of the strength and wear resistance of the materials between the hub and the pulley can be prevented.

In the first embodiment described above, the hub side engagement portion 24 and the outer hub 23 are shaped into the ring-like shape having a continuous periphery. However, as shown in the perspective view of the hub in FIG. 3, a plurality of slits 25 may be formed with suitable spacing among them in the circumferential direction on the rear side portion of each of the hub side engagement portion 24 and the outer hub 23. When the rear side portion of each of the hub side engagement portion 24 and the outer hub 23 is divided into the split shape in this way, an economical light-weight power transmission device free from interference between the pulley 1 and the hub 2 can be acquired in a pulley structure in which strength reinforcing portions (ribs) 11c are disposed on the bottom of the concave portions 11 of the pulley 1 in such a fashion as to correspond to the slits 25 in the resin pulley 1 having a relatively lower strength than the metal pulley 1.

Figure 4:
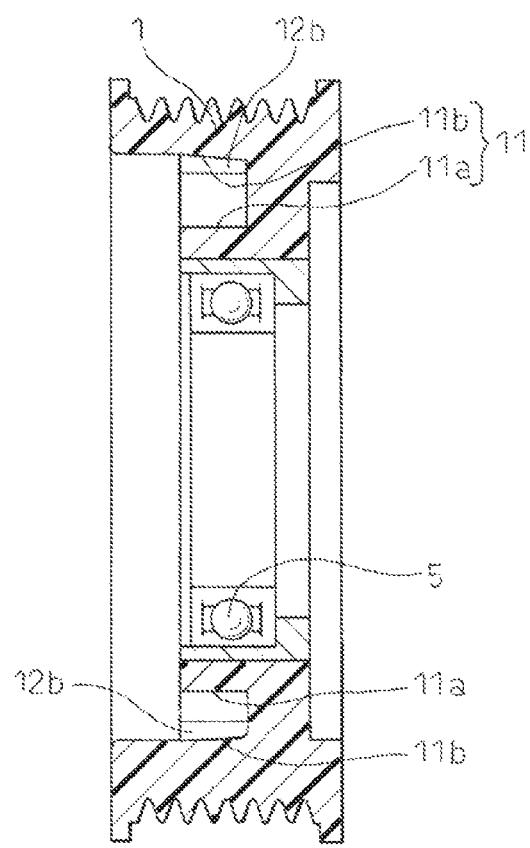
FIG. 4 is a sectional view of a pulley in a second embodiment.

FIG. 4 is a sectional view of a pulley according to the second embodiment. In the second embodiment, the outside surface 11b of the concave portion 11 of the pulley 1 is tapered (inclined) in such a fashion as to be somewhat narrowed from the front side to the rear side. Consequently, the assembly performance between the hub 2 and the pulley 1 can be improved and hence, the productivity can be improved. Naturally, the inside surface 11a of the concave portion 11 of the pulley 1 may be substantially tapered or both outside surface 11b and inside surface 11a may be substantially tapered.

The outside shape of one or both of the first and second hub side engagement portions 24a and 24b on the hub side 2 may be formed substantially into the taper form in place of the pulley 1 side.

Figure 5:
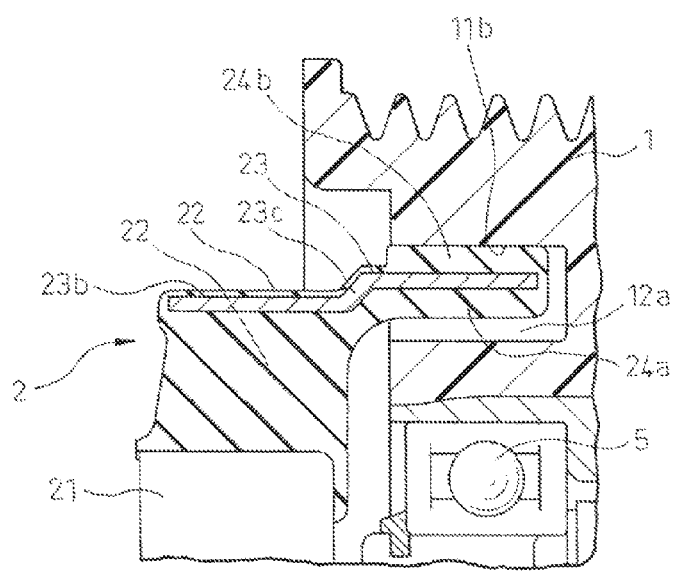
FIG. 5 is a sectional view of a principal part of a hub in a third embodiment.

FIG. 5 is a sectional view of a principal part of the third embodiment. In the first embodiment, the upper surface of the outer hub 23 is exposed to the outside with the exception of the portion on which the second hub side engagement portion 24b is formed, that is, the upper surface of the front side portion. When the upper surface of the outer hub 23 is locally uncovered with the torque transmitting elastic member 22 such as when the outer hub 23 is formed of a metal outer ring 23, the problem of the corrosion resistance occurs and appearance is not good, either. Therefore, painting must be applied to the upper surface of the outer hub 23 exposed to the outside. In the third embodiment, therefore, the torque transmitting elastic member 22 covers the entire surface inclusive of the exposed upper surface 23b of the outer hub 23. The exposed upper surface 23b may be covered with a thin film elastic member 22. The rest of the construction is fundamentally the same as that of the first embodiment and the explanation will be omitted.

Consequently, the corrosion resistance of the outer hub (outer ring) 23 can be improved. Because the outer hub 23 has the same color as the torque transmitting elastic member 22, the performance of preventing from dazzling becomes high and the feel can be improved by selecting a black elastic member, for example. Because painting is not necessary and the painting step can be eliminated, the environment of the factory can be improved and the production cost can be decreased.

Figure 6:
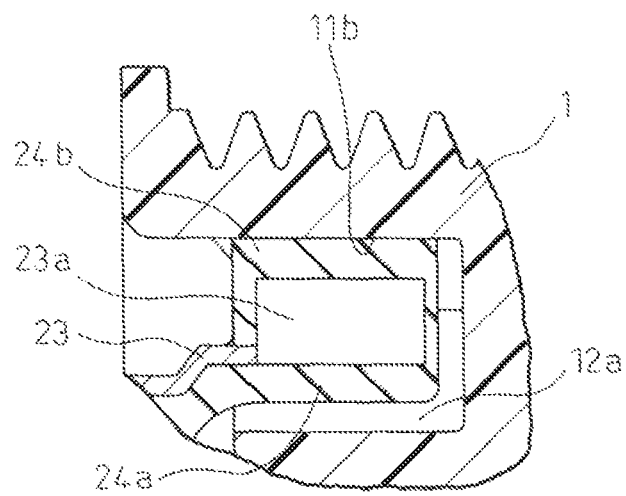
FIG. 6 is a sectional view of a principal part of a hub in a fourth embodiment.
Figure 7:
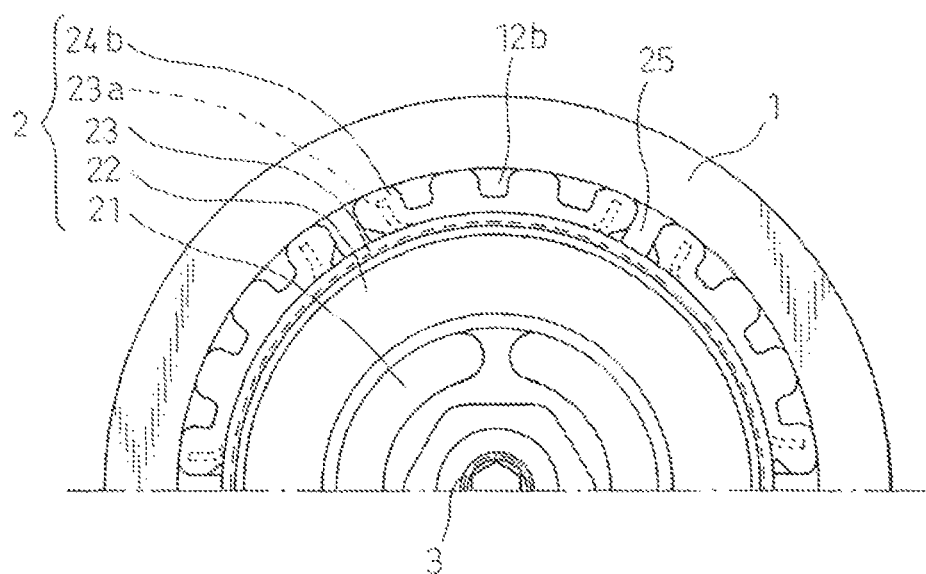
FIG. 7 is an upper half front view of a power transmission device in the fourth embodiment.

FIG. 6 is a sectional view of a principal part of the fourth embodiment and FIG. 7 is an upper half front view of the power transmission device according to the fourth embodiment. In the first to third embodiments, the concavo-convex portion of the hub side engagement portion 24 is formed of the same elastic material as the torque transmitting elastic member 22. Therefore, during the high load operation in which the driving torque of the compressor is large or when the compressor undergoes seizure and an excessive torque acts on the concavo-convex portion of the hub side engagement portion 24, there is the possibility that cracks occur in the concavo-convex portion or in the hub side engagement portion 24 or the concavo-convex portion is broken due to insufficiency of the strength of the concavo-convex portion or an insufficiency of the strength of the adhesive bonding the hub side engagement portion 24 to the inner and outer peripheries of the outer hub (outer lace) 23.

In the fourth embodiment, a plurality of reinforcing portions 23a is disposed on the outer hub (outer ring) 23 in the normal direction and is buried into the concavo-convex portion of the second hub side engagement portion 24b. This reinforcing portion 23a may be formed integrally with the outer hub 23 by cutting up a part of the outer hub 23 or by forming a separate member and fixing the separate member to the outer hub 23 by welding, or the like. In the fourth embodiment, the reinforcing portion 23a is so formed as to face outward in the radial direction. When a plurality of slits 25 is formed in the second hub side engagement portion 24b in the circumferential direction and the concavo-convex portion is divided into a plurality of groups, the reinforcing portions 23a are buried into the convex portions on both sides of the groups as shown in FIG. 7. The rest of the construction is fundamentally the same as that of the first embodiment and an explanation will be omitted.

The strength of the concavo-convex portion can be improved because the reinforcing portions 23a are formed in the outer hub 23 and are buried into the concavo-convex portions of the hub side engagement portion 24. In other words, when the excessive torque develops, the reinforcing portions 23a bear the torque and large displacement of the elastic member can be suppressed. Accordingly, breakage of the elastic member can be prevented.

Figure 8A:
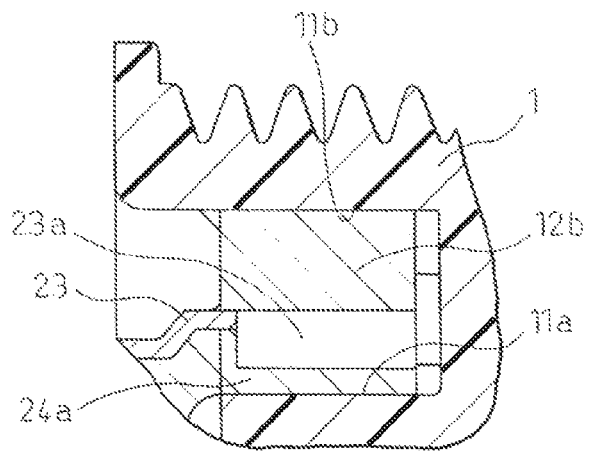
FIGS. 8A, 8B and 8C show modified embodiments of the fourth embodiment, respectively.
Figure 8B:
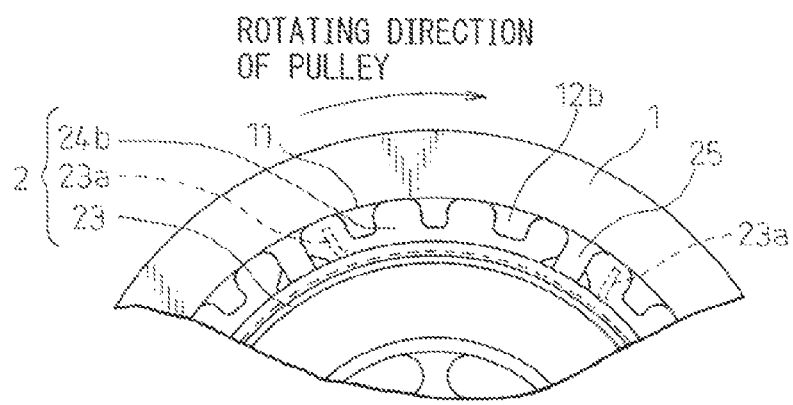
Figure 8C:
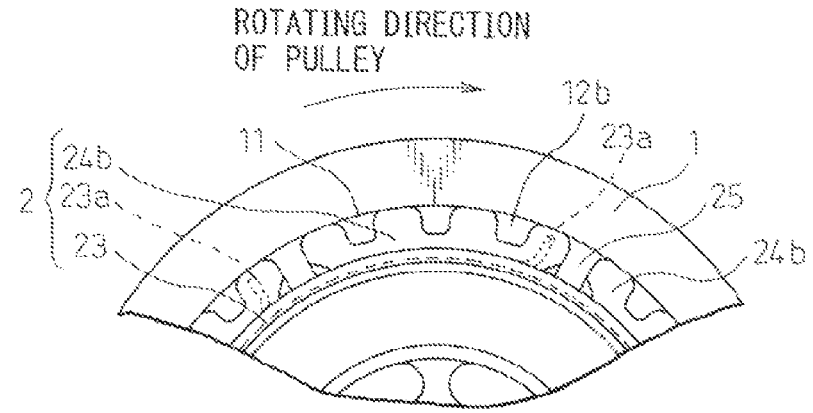

FIGS. 8A to 8C show the first to third modified embodiments of the fourth embodiment, respectively. FIG. 8A shows the first modified embodiment, wherein the reinforcing portions 23a are so formed in the outer hub 23 as to face inward in the radial direction. The reinforcing portions 23a are buried into the concavo-convex portion of the first hub side engagement portion 24a.

In the second modified embodiment shown in FIG. 8B, the reinforcing portions 23a, formed in the outer hub 23 as to face outward in the radial direction, are buried into only the convex portions corresponding to the rear side among the group of the concavo-convex portions of the second hub side engagement portion 24b in the rotating direction.

In the third modified embodiment shown in FIG. 8C, the reinforcing portions 23a, formed in the outer hub 23 as to face outward in the radial direction, are buried into only the convex portions corresponding to the front side among the group of the concavo-convex portions of the second hub side engagement portion 24b in the rotating direction.

Any of these first to third modified embodiments can improve the strength of the hub side engagement portion 24.

Figure 9A:
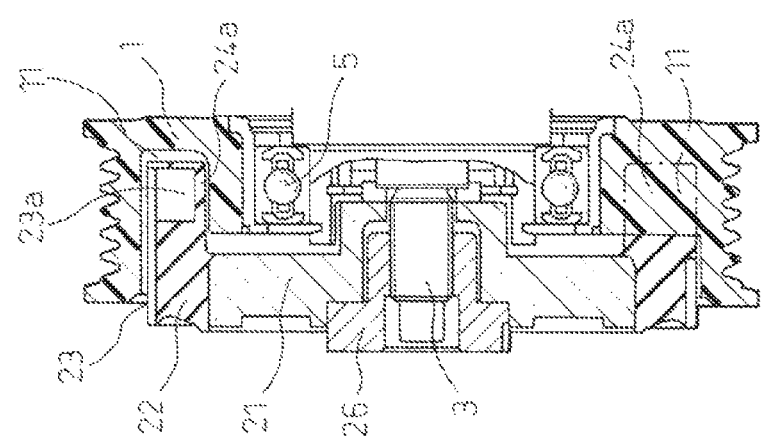
FIGS. 9A and 9B are a sectional view and a front view of the modified embodiment of the fourth embodiment.
Figure 9B:
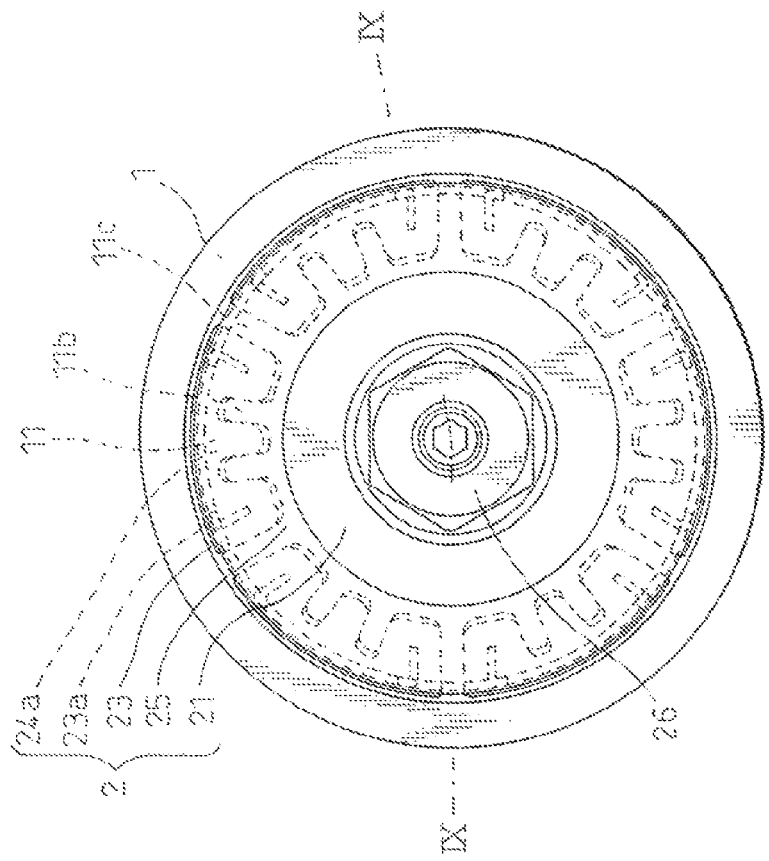

In the first modified embodiment shown in FIG. 8A, the reinforcing portions 23a are buried into the convex portions of the first hub side engagement portion in the construction where the first hub side engagement portion 24a is disposed on the inner peripheral side of the outer hub 23 and the second hub side engagement portion 24b, on the outer peripheral side. However, in the construction in which the hub side engagement portion 24 is provided to the outer hub 23 only on the inner peripheral side as shown in FIGS. 9A and 9B, a part of the outer ring 23 may be buried as the reinforcing portion 23a into the hub side engagement portion 24. Similarly, in the construction in which the hub side engagement portion 24 is provided to the outer hub 23 only on the outer peripheral side, a part of the outer ring 23 may be buried as the reinforcing portion 23a into the hub side engagement portion 24.

Incidentally, FIG. 9A is a sectional view taken along a dash line IX-IX of FIG. 9B and reference numerals used in FIGS. 9A and 9B denote the same constituent members as in other embodiments.

FIG. 10 is a sectional view showing a principal part of the fifth embodiment and FIG. 11 shows another embodiment of the invention for comparison with the fifth embodiment. As represented by the fist embodiment shown in FIG. 1 and the comparative example shown in FIG. 11, when the axial direction center A of the cylindrical elastic portion 22a as the main body portion of the torque transmitting elastic member 22 and the axial direction center B of the hub side elastic engagement portion 24 formed of the torque transmitting elastic member 22 are arranged with hardly any offset, drawing of the cylindrical elastic portion 22a cannot be conducted and durability of the cylindrical elastic portion 22 markedly drops. Therefore, when the excessive torque or the excessive torque fluctuation is imparted, the cylindrical elastic portion 22a of the torque transmitting elastic member 22 is likely to be broken. In this fifth embodiment, therefore, the hub side engagement portion 24 formed of the torque transmitting elastic member 22 and the cylindrical elastic portion 22a as the main body portion of the torque transmitting elastic member 22 are arranged in the offset form. This arrangement makes it possible to conduct drawing of the outer peripheral portion of the cylindrical elastic portion 22a (outer peripheral portion of outer hub).

In other words, the rear half of the outer hub 23 on the rear side is encompassed by the torque transmitting elastic member 22 in the fifth embodiment and its outer peripheral surface has the concavo-convex shape to form the hub side engagement portion 24. The front half of the inner peripheral surface of the outer hub 23 on the front side and the outer peripheral surface of the inner hub 21 clamp the torque transmitting elastic member 22 to form the cylindrical elastic portion 22a. The axial direction center B of the hub side engagement portion 24 and the axial direction center A of the cylindrical elastic portion are offset by $\epsilon$. The offset amount $\epsilon$ is preferably at least not less than ¼ with respect to the minimum thickness t of the cylindrical elastic portion 22a. Therefore, a space S for conducting drawing can be secured round the outer peripheral portion of the cylindrical elastic portion 22a (outer peripheral portion of outer hub 23) above the outer hub 23 on the front side by a jig shown in FIG. 13. It is known that this drawing is applied in order to improve durability of the elastic member 22 and a drawing ratio is about dozens of percent with respect to the outer shape of the cylindrical elastic portion 22a. The step portion 23c formed on the outer hub 23 in FIG. 5 represents that this drawing is conducted. The rest of the constructions are basically the same as that of the first embodiment.

The sectional view of FIG. 10 shows the construction in which the inner hub 21 and the rotary shaft 3 are interconnected to each other through the torque limiter 26 but this embodiment can be applied also to the construction in which the inner hub 21 and the rotary shaft 3 are directly connected.

FIG. 12 is a longitudinal sectional view of the power transmission device according to the sixth embodiment. In this sixth embodiment, a weight portion 91 of a balancer weight 9 is accommodated in the space formed in the fifth embodiment. The balancer weight 9 has a substantially disk-like shape and the weight portion 91 is formed near its outer peripheral portion. The balancer weight 9 is fixed to the front side of the inner hub 21 by using a fixing member 10 such as a rivet or a bolt and the weight portion 91 is fitted in such a fashion as to be positioned at a position corresponding to the space S formed on the front surface of the second hub side engagement portion 24b on the front side. Incidentally, the balancer weight 9 may be fitted by a screw, by press-fitting, by caulking, etc., without using the fixing member 10. The rest of the constructions are basically the same as that of the first embodiment.

Because the balancer weight 9 is disposed by utilizing the space S, the balancer weight 9 can be installed without increasing the physical structure and a power transmission device having low noise and low vibration can be provided.

FIG. 13A is a front view and FIG. 13B is a sectional view showing an example of the drawing step of the cylindrical elastic portion 22a. The hub 2 including the outer hub 23, the torque transmitting elastic member 22 inclusive of the hub side engagement portion 24, the inner hub 21 and the torque limiter 26 is set to a jig 200 and the cam 201 having a plurality (16, in FIG. 13B) of cams are arranged on the outer periphery of the cylindrical elastic portion 22a of the torque transmitting elastic member 22 in the circumferential direction while keeping contact with the outer periphery of the cylindrical elastic portion 22a. The cam 201 has a trapezoidal shape and a taper surface on the outside. The same number of jigs 202 as the number of the cams 201 are arranged outside the cams 201 in the circumferential direction in such a fashion as to correspond to the cams 201, respectively. The jig 202, too, has the trapezoidal shape and a taper surface on the inside. The taper surface of the cam 201 and the taper surface of the jig 202 are arranged while keeping contact with one another. When the jig 202 is allowed to slide from the right to the left in FIG. 15, the cam 201 moves in a direction that contracts the diameter. Consequently, the cylindrical elastic portion 22a of the torque transmitting elastic member 22 is compressed in the diametric direction and is drawn. Therefore, the outer peripheral portion of the cylindrical elastic member 22a (outer peripheral portion of outer hub) turns to a substantial 16-gon, as shown in FIG. 13A.

Here, the durability of the cylindrical elastic portion 22a against the strain in the rotating direction changes depending on the degree of strain of the cylindrical elastic member 22a in the radial direction. The durability against the strain in the rotating direction becomes lower when the cylindrical elastic portion 22a is pulled more greatly in the radial direction and is distorted, and becomes higher against the strain in the rotating direction when it is pressed in the radial direction and undergoes distortion, to the contrary.

Because the cylindrical elastic portion 22a is molded at a high temperature while clamped between the outer hub 23 and the inner hub 21, the bond surfaces of the outer hub 23 and the inner hub 21 pull the cylindrical elastic portion 22a in the radial direction when the cylindrical elastic portion 22a undergoes shrinkage as it is cooled.

In other words, when drawing is conducted as described above, the strain can be mitigated by the tensile stress of the cylindrical elastic member 22a in the radial direction and the durability of the cylindrical elastic member 22a of the torque transmission elastic member 22 against the strain in the rotating direction can be secured.

FIGS. 14 to 17 are explanatory views useful for explaining the power transmission device according to the seventh embodiment. When the hub side engagement portion 24 and the pulley side engagement portion 12 are fitted to each other through concavo-concave engagement and power is transmitted through this concave-convex fitting portion, the disadvantages of abnormal wear of the concave-convex portion of the hub side engagement portion 24 formed of the elastic material and breakage of the concave-convex portion occur when the operation is made with an excessive load or the torque changes owing to the compressive force generated by the compressor. In the seventh embodiment, therefore, the shapes of the concavo-convex portions of the hub side engagement portion 24 and the pulley side engagement portion 12 are improved in the following three aspects.

Figure 14A:
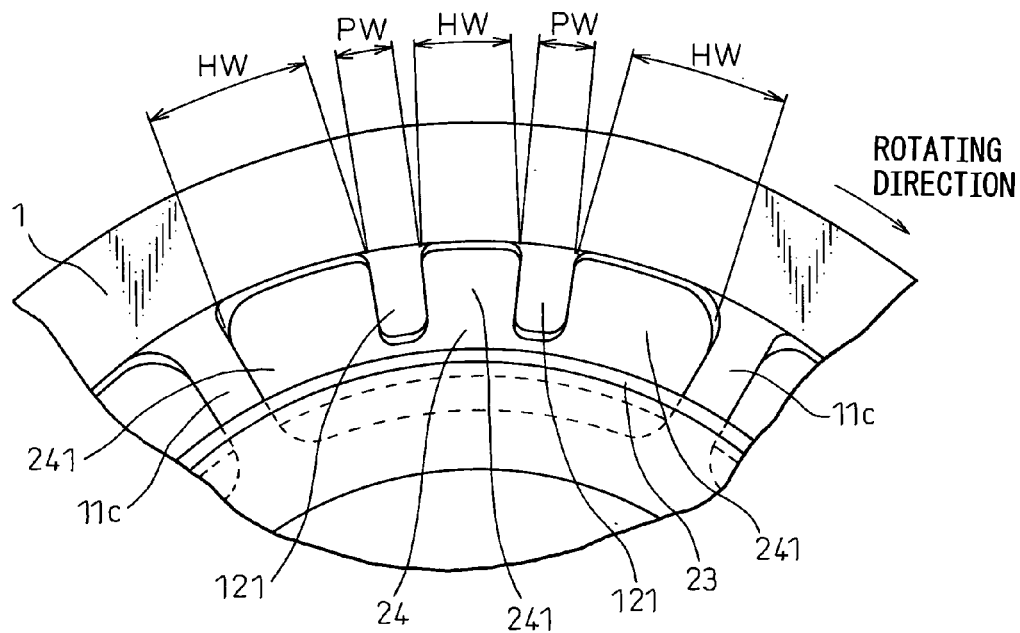
FIG. 14A is a front view of a principal portion for explaining a power transmission device according to a seventh embodiment of the invention and FIG. 14B is a front view of a principal portion of another embodiment for comparison.
Figure 14B:
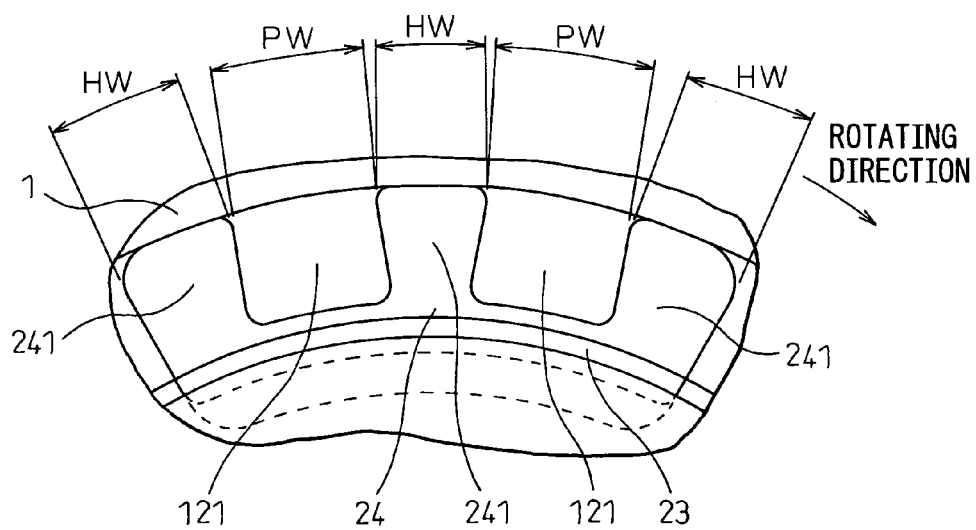

FIG. 14A is a front view of a principal part for explaining the power transmission device of the seventh embodiment from the first aspect and FIG. 14B is a front view of a principal part showing another embodiment for comparison. In other words, as shown in FIG. 14B, the problem of the durability of the hub side engagement portion 24 occurs when the concavo-convex shapes are set in such a fashion that the maximum width HW of the convex portion 241 of the concavo-convex shape of the hub side engagement portion 24 is smaller than the maximum width PW of the convex portion 121 of the pulley side engagement portion 12. Therefore, the first aspect is intended to improve the width of the convex portion 241 of the hub side engagement portion 24.

In concavo-convex engagement between the pulley side engagement portion 12 and the hub side engagement portion 24 shown in FIG. 14A, the concavo-convex portion of the hub side engagement portion 24 is divided substantially into 6 parts or in other words, six slits 25 are disposed in the concavo-convex portion. Three convex portions 241 and two concave portions 242 are formed between the slits 25. On the other hand, ribs 11c are so disposed as to correspond to the slits 25 and two convex portions 121 and three concave portions 122 are formed between the ribs 11c in the pulley side engagement portion 12 in such a fashion as to correspond to the hub side engagement portion 24. The hub side engagement portion 24 and the pulley side engagement portion 12 are thus fitted to one another through concavo-convex fitting. In the seventh embodiment, the maximum width HW of the convex portion 241 of the hub side engagement portion 24 formed of the elastic member is so set as to satisfy the relation HW≧PW with the maximum width PW of the convex portion 121 of the pulley side engagement portion 12, or the former is at least equal to or not less than the latter. Therefore, the strength of the hub side engagement portion 24 can be efficiently improved within the limited physical structure of the width elastic member.

Figure 15A:
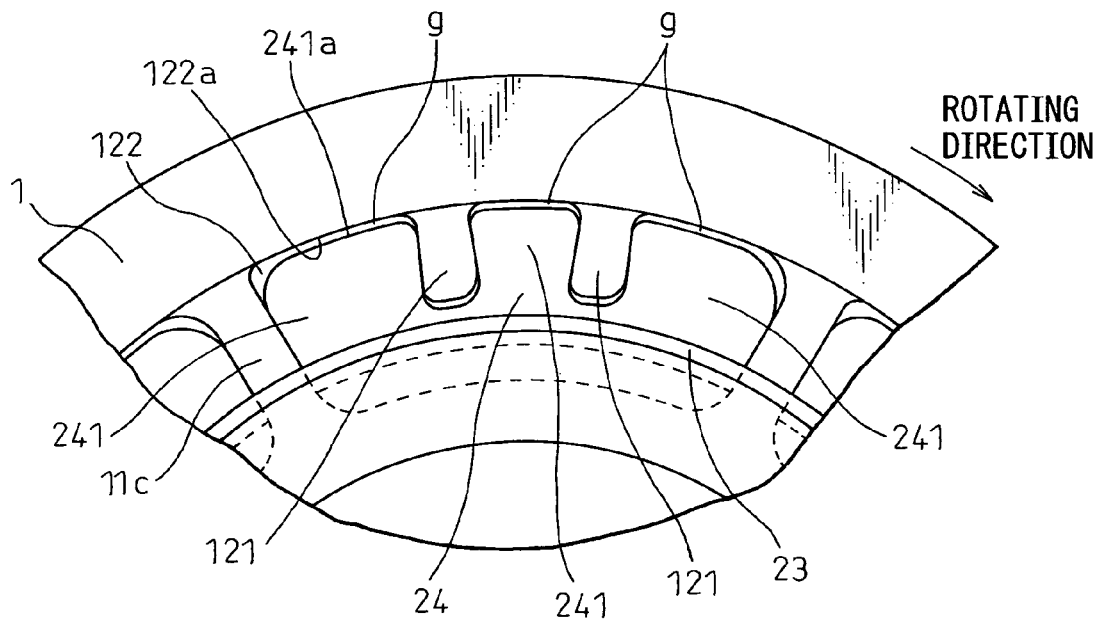
FIG. 15A is a front view of a principal portion of the power transmission device according to the seventh embodiment of the invention and FIG. 15B is a front view of a principal portion of another embodiment for comparison.
Figure 15B:
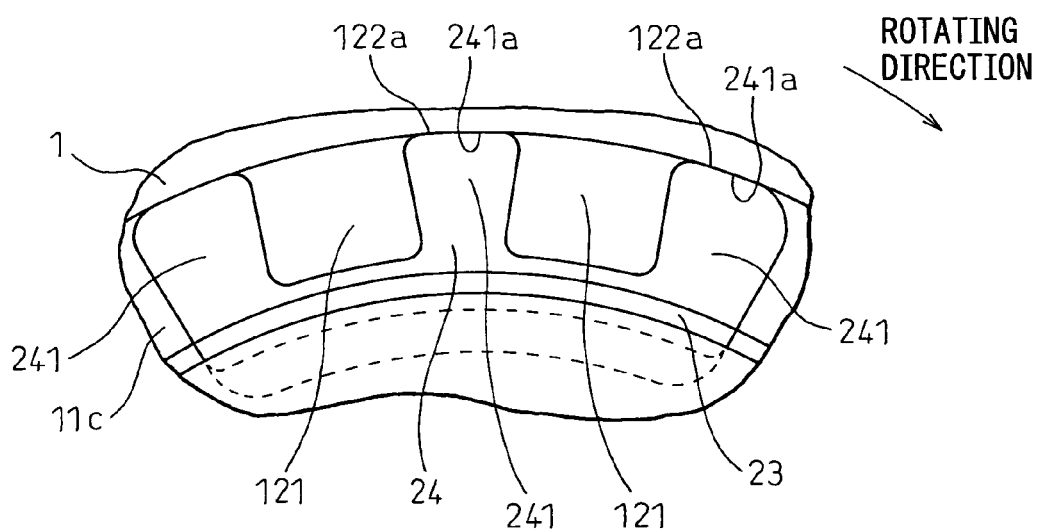

FIG. 15A is a front view of a principal portion for explaining the power transmission device of the seventh embodiment from the second aspect and FIG. 15B is a front view of a principal part of another embodiment for comparison. In other words, when the distal end portion 241a of the convex portion 241 of the hub side engagement portion 24 keeps contact with the bottom portion 122a of the concave portion 122 of the pulley side engagement portion 12, the motion is a sliding motion and the convex portion 241 of the hub side engagement portion 24 formed of the elastic material is worn out. Generally, the hub 2 and the pulley 1 suffer minute displacement during transmission of the excessive torque, but when they keep mutual contact as described above, motion becomes the sliding portion and the convex portion 241 of the elastic member is worn out.

In this seventh embodiment, therefore, a gap g of at least 0.001 mm is disposed between the distal end portion 241a of the convex portion 241 of the hub side engagement portion 24 and the bottom portion 122a of the concave portion 122 of the pulley side engagement portion 12 as shown in FIG. 15A. Because the gap g is thus disposed between the distal end portion 241a of the convex portion 241 of the hub side engagement portion 24 formed of the elastic material and the bottom portion 122a of the concave portion 122 of the pulley engagement portion 12, wear due to contact can be prevented.

Figure 16:
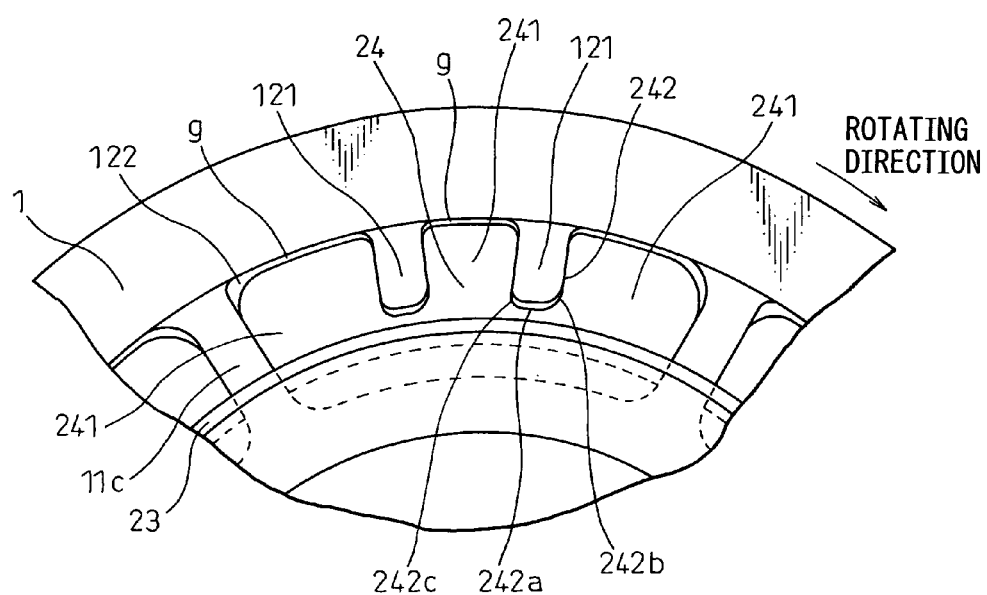
FIG. 16 is a front view of a principal portion of the power transmission device according to the seventh embodiment.
Figure 17A:
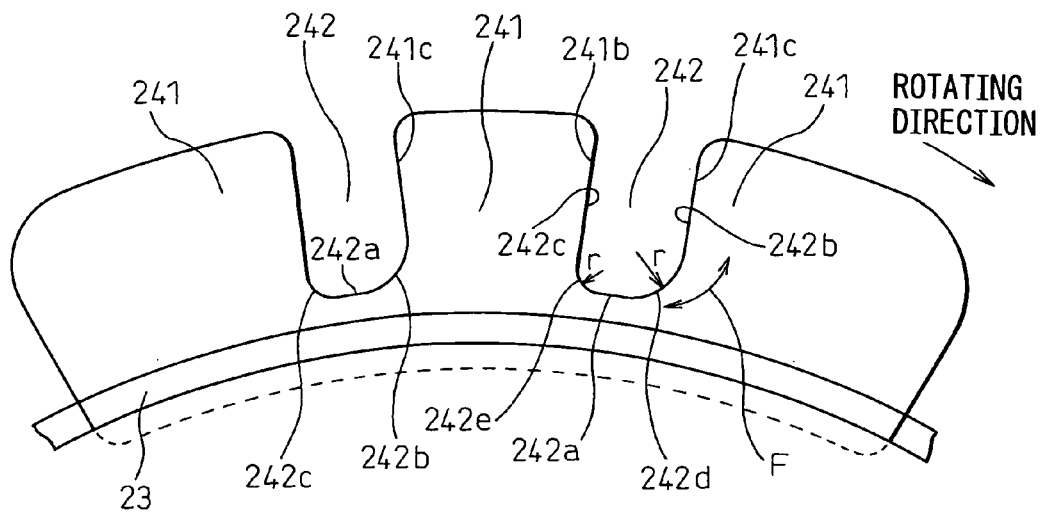
FIG. 17A is a front view of a principal portion of a hub side engagement portion in the seventh embodiment of the invention and FIG. 17B is a front view of a principal portion of the hub engagement side of another embodiment for comparison.
Figure 17B:
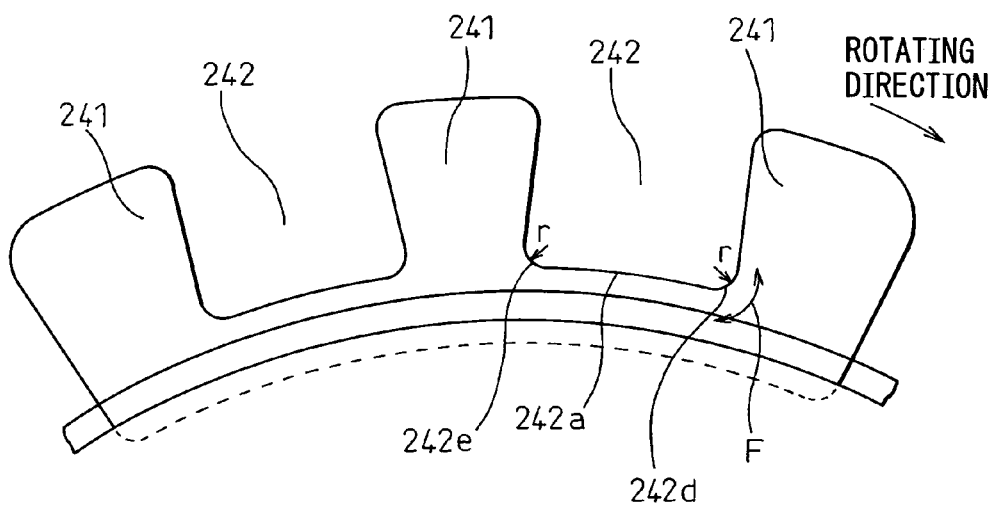

FIGS. 16 and 17A are front views of a principal part for explaining the power transmission device of the seventh embodiment from the third aspect and FIG. 17B is a front view of a principal part showing another embodiment for comparison. An R1 portion 242d as a corner of the bottom portion 242a of the concave portion 242 of the hub side engagement portion 24 on the side of the rotating direction receives the excessive torque and a large stress F occurs as shown in FIG. 17B. When the radius of curvature r of the R1 portion is small, it cannot withstand this stress F and may be broken.

In the seventh embodiment, therefore, the radius of curvature r of the R1 portion 242b positioned on the side of the rotating side (front side) of the R1 portion 242d and an R2 portion 242e disposed on both sides of the bottom portion 242a of the concave portion 242 of the hub side engagement portion 24 is set to be greater than the radius of curvature r of the R2 portion 242e positioned on the side of the counter-rotating direction (rear side) as shown in FIGS. 16 and 17A. Consequently, it is possible to mitigate the tensile stress S occurring at the R1 portion (corner) 242d (root of the convex portion 241) of the bottom portion 242a of the concave portion 242 of the hub side engagement portion 24 owing to the excessive torque and to improve the durability of the power transmission device. Incidentally, when the radii of curvature r of both R1 portion 242d and R2 portion 242e on the sides of the rotating direction and counter-rotating direction are increased, the width of the convex portion 121 of the pulley side engagement potion 12 becomes great and the pulley is likely to have a large diameter as a whole. In the seventh embodiment, therefore, it is preferred to increase the radius of curvature r of only the R1 portion 242d on the side of the rotating direction.

Therefore, the concave portion 242 of the hub side engagement portion 24 is asymmetric on the sides of the rotating direction and counter-rotating direction.

As described above, the seventh embodiment improves the concavo-convex shape of the concavo-convex fitting portions and improves the durability of the power transmission device by using the following three means.

(1) The maximum width HW of the convex portion 241 of the hub side engagement portion 24 is set to be at least equal to or not less than the maximum width PW of the convex portion 121 of the pulley side engagement portion 12 to improve the strength of the hub side engagement portion 24.

(2) The gap g is disposed between the distal end portion 241a of the convex portion 241 of the hub side engagement portion 24 and the bottom portion 122a of the concave portion 122 of the pulley side engagement portion 12 to prevent the wear of the convex portion 241 of the hub side engagement portion 24.

(3) The radius of curvature r of the R1 portion 242d on the side of the rotating direction among the R1 portion 242d and the R2 portion 242e as corners on both sides of the bottom portion 242a of the concave portion 242 of the hub side engagement portion 24 is set to be greater than the radius of curvature r of the R2 portion 242e on the side of the counter-rotating direction to mitigate the tensile stress occurring at the R1 portion.

FIGS. 18A to 19A are front views of a principal part for explaining the power transmission device of the eighth embodiment. This eighth embodiment improves the positions of the transmission surfaces of both concavo-convex portions for transmitting the torque of the concavo-convex fitting portions between the hub side engagement portion 24 and the pulley side engagement portion 12. In other words, as shown in FIG. 19B, when the concavo-convex portions of the pulley side engagement portion 12 and the hub side engagement portion 24 have a concavo-convex shape formed of a spline profile, the side surfaces 122b and 122c of the concave portion 122 of the pulley side engagement portion 12 and the side surfaces 241b and 241c of the convex portion 241 of the hub side engagement portion 24 keep contact with one another for power transmission and form the torque transmission surface TF. This torque transmission surface TF is formed at a position that is deviated by an angle α with respect to the rotating direction (direction of normal). When the excessive torque or torque fluctuation occurs, therefore, the concave-convex fitting portion is twisted by the pulley 1 and the rotary shaft 3 of the compressor, and generates slip SL shown in FIG. 19B. Consequently, the torque transmission surface TF of the concavo-convex portion of the hub side engagement portion 24 formed of the elastic member is likely to be abnormally worn out.

Figure 18A:
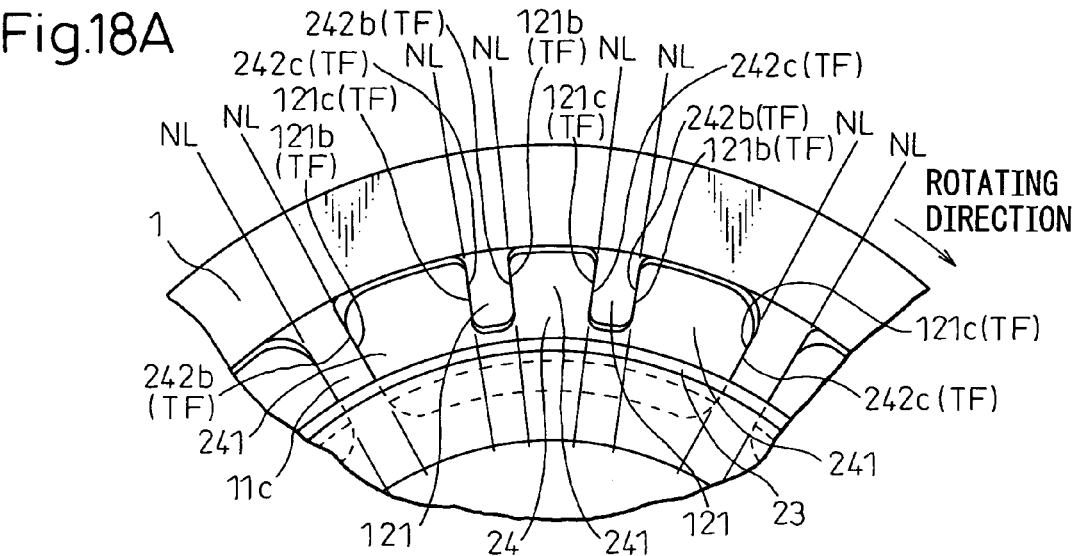
FIG. 18A is a front view of a principal portion of a power transmission device in an eighth embodiment of the invention.

Therefore, the eighth embodiment improves the position of this torque transmission surface TF. As shown in FIG. 18A, the side surfaces 241b and 241c of the convex portion 241 of the hub side engagement portion 24 (provided that the slits 25 are regarded as the concave portions of the hub side engagement portion 24) and the side surfaces 122b and 122c of the concave portion 122 of the pulley side engagement portion 12 (provided that the ribs 11c are regarded as the convex portions of the pulley side engagement portion 12) keep mutual contact and form the torque transmission surface TF. In the eighth embodiment, the concavo-convex portions of the hub side engagement portion 24 and the pulley side engagement portion 12 are formed so that the torque transmission surface TF is arranged on the normal NL of the pulley 1 (or in other words, on a line intersecting at right angles the circumference of an arbitrary circle having the rotary shaft as the center in the radial direction).

Figure 18B:
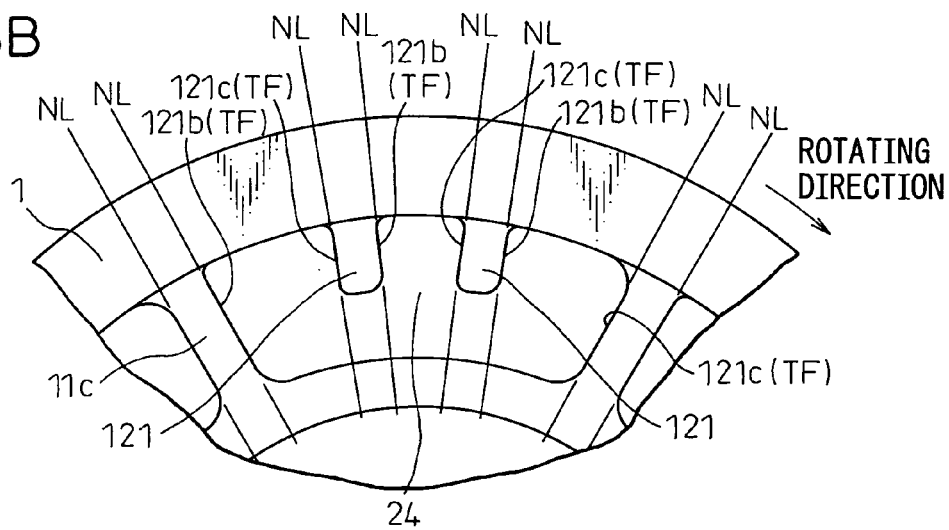
FIG. 18B is a front view of a principal portion of a pulley side engagement portion in the eighth embodiment and FIG. 18C is a front view of a principal portion of a hub side engagement portion in the eighth embodiment.
Figure 18C:
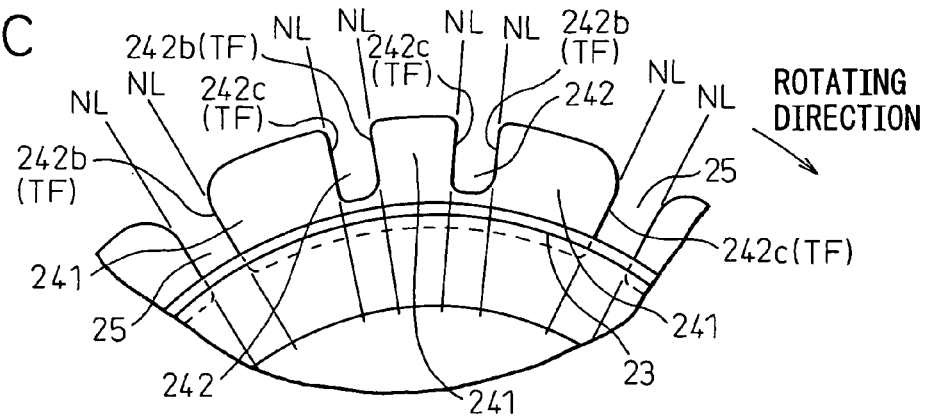

FIG. 18B is a front view of the concavo-convex portion of the pulley side engagement portion 12. The side surfaces 121b and 121c (side surfaces 122b and 122c of concave portion 122, too) of the convex portion 121 of the pulley side engagement portion 12 (inclusive of ribs 11c) operate as the torque transmission surface TF and this torque transmission surface TF is completely positioned on the normal NL of the pulley 1. FIG. 18C is a front view of the concavo-convex portion of the hub side engagement portion 24. The side surfaces 241b and 241c (side surfaces 242b and 242c of concave portion 242, too) of the convex portion 241 of the hub side engagement portion 24 (inclusive of slits 25) operate as the torque transmission surface TF and this torque transmission surface TF is completely positioned on the normal NL of the pulley 1.

Figure 19A:
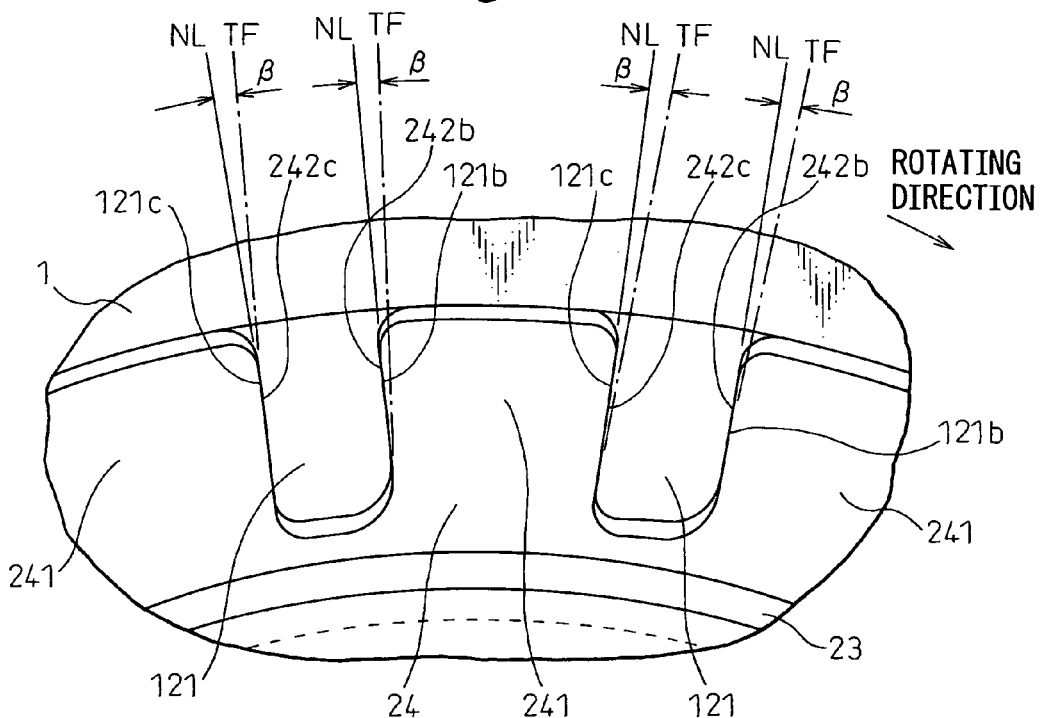
FIG. 19A is a front view of a principal portion of a power transmission device in a modified embodiment of the eighth embodiment and FIG. 19B is a front view of a principal portion of another embodiment for comparison.
Figure 19B:
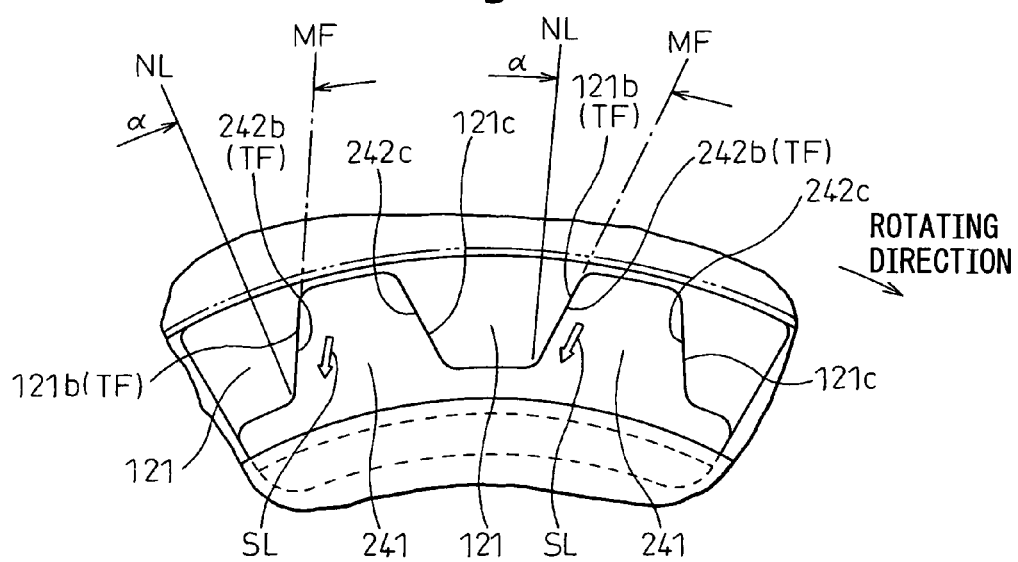

FIG. 19A shows a modified embodiment of the eighth embodiment. The torque transmission surface TF may be deviated by a predetermined angle β in the rotating direction with the normal NL of the pulley 1 as the reference. No problem occurs when this predetermined angle β is about 10° in the rotating direction with the normal NL as the reference or about 45° in the rotating direction (−45° from the rotating direction) in the counter-rotating direction.

In the eighth embodiment, two torque transmission surfaces TF formed by the side surface 121b of the convex portion 121 of the pulley side engagement portion 12 on the rotating side and the side surface 121c on the counter-rotating side may be substantially parallel to each other (see FIG. 18B). In this case, two torque transmission surfaces TF formed by the side surface $11c_1$ of the rib 11c on the rotating side and the side surface $11c_2$ on the counter-rotating side may be substantially parallel to each other. When viewed from the hub 2 side, this means that the two torque transmission surfaces TF formed by the side surface 242b of the concave portion 242 of the hub side engagement portion 24 and the side surface 242c on the counter-rotating side may be substantially parallel to each other (see FIG. 18C). This means also that the two torque transmission surfaces TF formed by the side surface of the slit 25 on the rotating side and the side surface thereof on the counter-rotating side may be likewise substantially parallel to each other.

As described above, in the eighth embodiment, arranging the torque transmission surface TF as the surface for transmitting the torque and formed by the concavo-convex portions of the pulley side engagement portion 12 and the hub side engagement portion 24 on the normal NL, can thus suppress the occurrence of the delicate slip SL on the concavo-convex portions owing to the excessive torque operation or torque fluctuation, and can avoid the abnormal wear of the concavo-convex portion.

Figure 20:
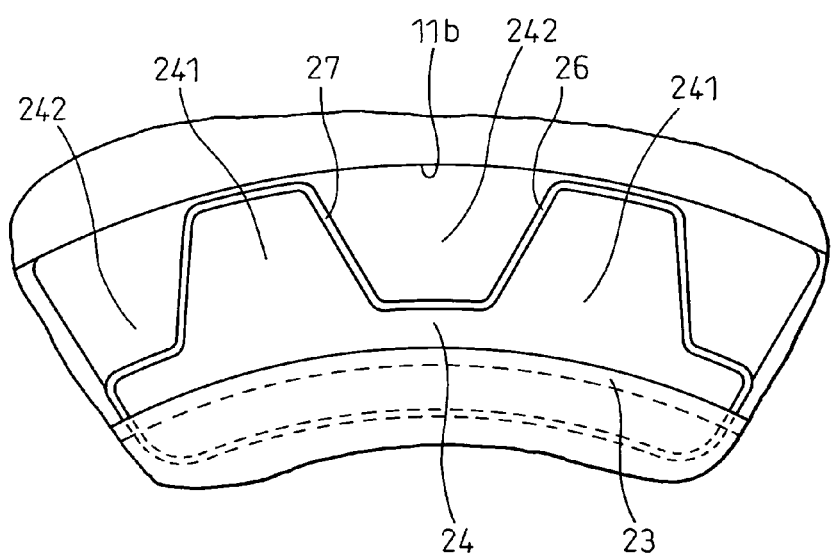
FIG. 20 is a front view of a power transmission device according to a ninth embodiment of the invention.

FIG. 20 is a front view of a principal part for explaining the ninth embodiment. The invention proposes a power transmission construction between the pulley 1 and the hub 2 by fitting the pulley side engagement portion 12 of the pulley 1 and the hub side engagement portion 24 of the hub 2 through concavo-convex engagement. However, the concave-convex portion of the hub side engagement portion 24 formed of the elastic material is likely to be worn out abnormally or the concave portion is likely to be broken due to the excessive load operation or torque fluctuation owing to the compressive force generated by the compressor. In the ninth embodiment, therefore, a material having an excellent wear resistance (material having low frictional coefficient) is connected to the surface of the concavo-convex portion of the hub side engagement portion 24 formed of the elastic material or coating or surface treatment is applied to the surface of the concavo-convex portion so as to improve the wear resistance of the hub side engagement portion 24.

In other words, as shown in FIG. 20, for example, the concavo-convex portion of the hub side engagement portion 24 is substantially divided into six parts, or in other words, six slits 25 are formed, and two convex portions 241 and three concave portions 242 are formed between the slits 25. FIG. 20 shows only the concavo-convex portion interposed between the slits 25. On the other hand, the pulley side engagement portion 12 is provided with the ribs 11c in such a fashion as to correspond to the slits 25 of the hub side engagement portion 24, and three convex portions 121 and two concave portions 122 are formed between the ribs 11c. In this way, concave-convex fitting is achieved between the hub side engagement portion 24 and the pulley side engagement portion 12 and power is transmitted. Because the excessive torque acts on this concavo-convex portion, the wear resistance of the surface of the concave-convex portion is improved by bonding a material having an excellent wear resistance (material having low frictional coefficient) 27 or by coating a material 27 having a high wear resistance or by applying surface treatment to the surface of the concavo-convex portion of the hub side engagement portion 24 in order to especially prevent abnormal wear of the bottom portion 242a of the concave portion 242 and the distal end portion 241a of the convex portion 241 of the hub side engagement portion 24 formed of the elastic material.

Suitable examples of the material 27 excellent in the wear resistance include resin films represented by cross-linked tetrafluoroethylene (PTFE) and polyamide films, woven fabrics and non-woven fabrics woven by materials such as Nomex (trademark), Conex (trademark), Kevlar (trademark), metal thin sheets, and so forth.

Suitable examples of coating include those which contain fluoro compounds as the material having the low coefficient of friction such as graphite, molybdenum disulfide, tetrafluoroethylene (PTFE), PFA, and so forth.

As the surface treatment, chlorine treatment is effective for the concavo-convex shape formed of elastic members of chlorinated butyl rubber, ethylene-propylene-dien copolymer and acryl-ethylene copolymer as materials having double bonds.

Figure 21:
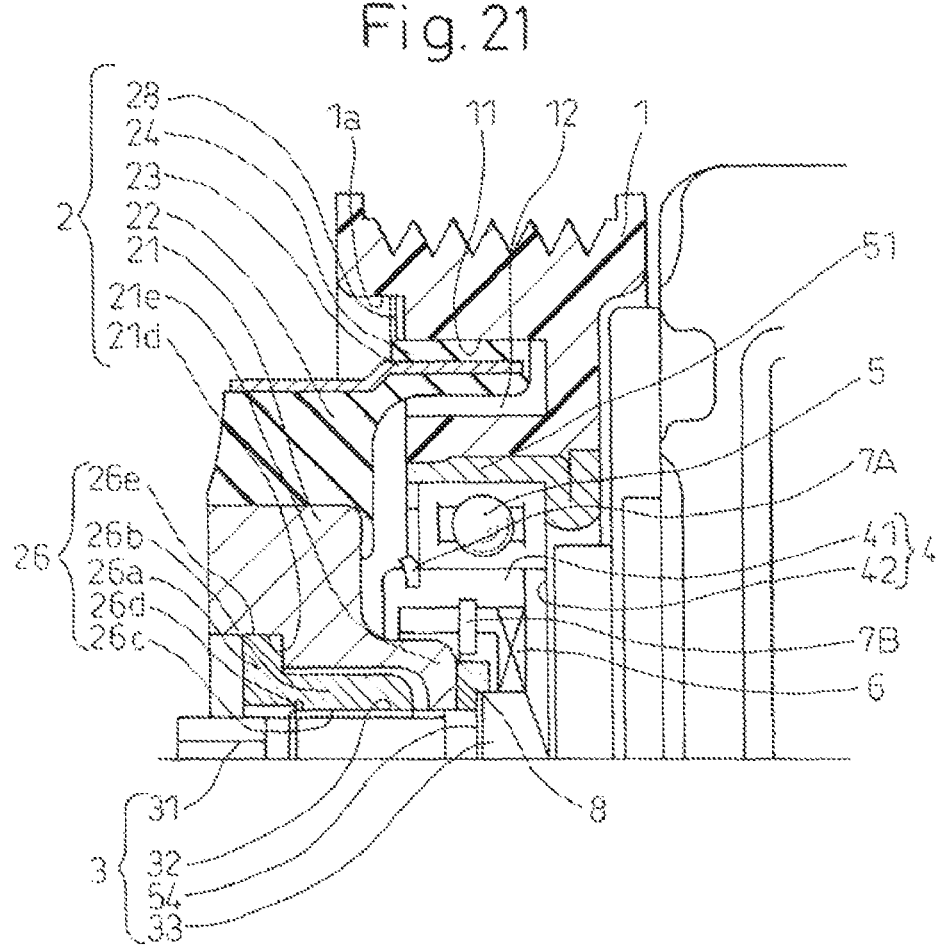
FIG. 21 shows an upper half of a longitudinal section of a power transmission device according to a tenth embodiment of the invention.
Figure 22:
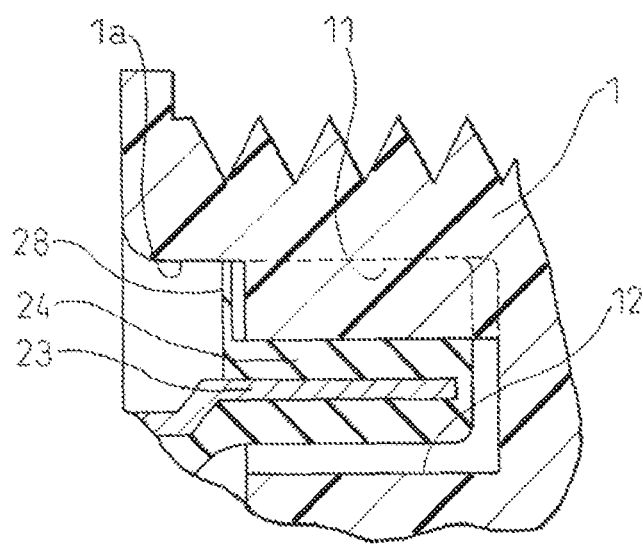
FIG. 22 is an enlarged view of main portions of FIG. 21.
Figure 23:
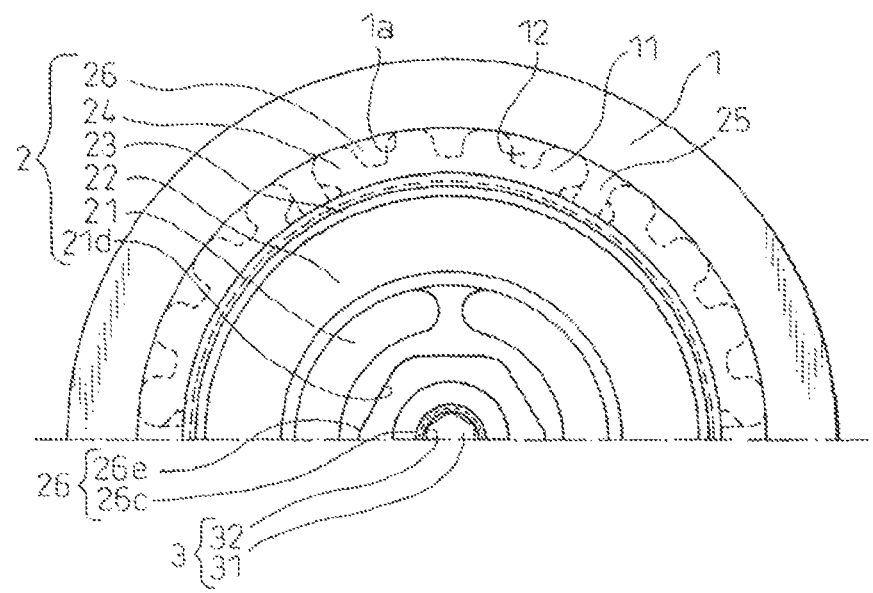
FIG. 23 is a front view that shows an upper half of the power transmission device according to the tenth embodiment of the invention.

FIG. 21 shows an upper half of a longitudinal section of a power transmission device according to a tenth embodiment of the invention and FIG. 22 is an enlarged view showing its main portions. FIG. 23 is a front view of the upper half of the power transmission device of the tenth embodiment of the invention. The power transmission device of the invention transmits power (torque) between a pulley 1 as a driving side rotary member for obtaining power from an engine or a motor and a hub 2 as a driven side rotary member fixed to a rotary shaft 3 of a compressor through a torque limiter 26. The pulley 1 and the hub 2 are arranged coaxially.

The pulley 1 is fitted to a cylindrical boss portion 41 disposed at one of the ends of a housing 4 of the compressor through a bearing 5 and a sleeve ring 51 in such a manner as to be capable of rotation. The pulley 1 is appropriately molded from a thermoplastic synthetic resin but may be formed of a metal material such as iron. Generally, the pulley 1, the sleeve ring 51 and the bearing 5 are integrated with one another by insert molding. A belt (not shown in the drawings) is wound on an outer peripheral surface of the pulley 1 and the pulley 1 is rotated by external power from the engine or the motor. The bearing 5 fits to a boss portion 41 and its movement in an axial direction is checked by the end of the boss portion 41 and a first snap ring 7A that is fitted into a groove formed in the outer peripheral surface of the boss portion 41. The housing 4 and the rotary shaft 3 are sealed by a seal device 6 to prevent leak of a refrigerant and oil. The movement of the seal device 6 in the axial direction is checked by a second snap ring 7B that is fitted into a groove formed in an inner peripheral surface of the boss portion 41.

A distal end portion of the rotary shaft 4 of the compressor protrudes from the housing 4 and includes, in the order from the distal end, a tool shape portion 31 formed into a tool shape, a screw portion 32 the outer circumference of which is formed into a screw and a large diameter shaft portion 33 having a diameter greater than that of the screw portion 32. A step portion 34 is formed between the screw portion 32 and the large diameter shaft portion 33. A washer 8 is fitted to the distal end portion of the rotary shaft 3 and strikes the step portion 34. A torque limiter 26 that will be described later in detail meshes with and fixed to the screw portion 32 the rotary shaft 3. Other fixing methods such as spline engagement, fitting by a bolt, and so forth, can be employed appropriately besides screwing to fix the torque limiter 26 to the rotary shaft 3.

The torque limiter 26 has a prismatic or cylindrical shape including a large outer diameter portion 26a having a large outer shape and a small outer diameter portion 32 having a small outer shape. The outer peripheral surface 26e of the large outer diameter portion 26a operates as a fitting portion 26e to the later-appearing inner hub 21. A screw portion 26c is formed on the inner peripheral surface of the small outer diameter portion 26b and meshes with the screw portion 32 of the rotary shaft 3. The inner diameter of the large outer diameter portion 26a is a little greater than the inner diameter of the small outer diameter portion 26b and a notch portion 26d is formed at a shift portion of their inner peripheral surfaces so that it can be easily broken when the torque limiter 26 receives an excessive large axial force.

Figure 3:
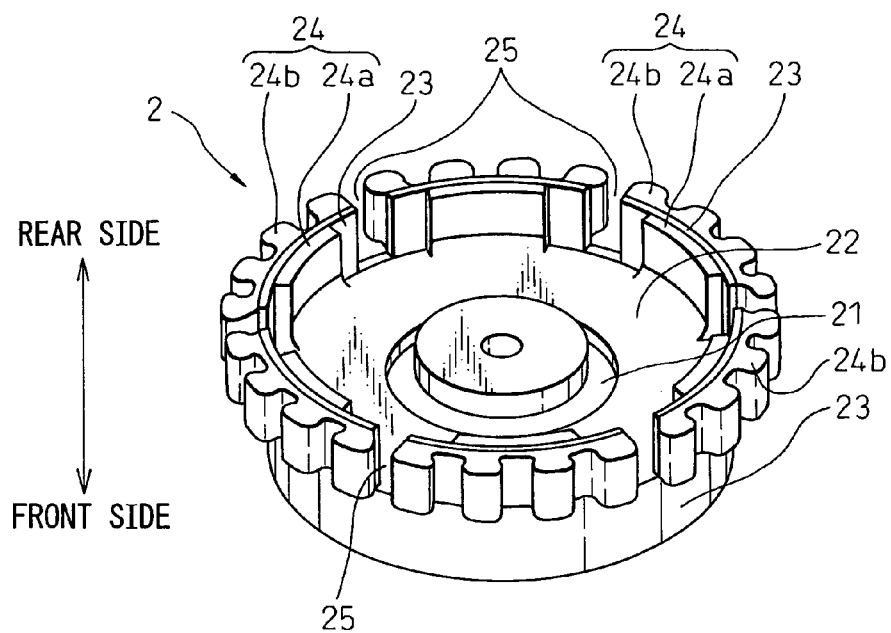
FIG. 3 is a perspective view of a hub in the first embodiment.

The hub 2 includes the inner hub 21, the torque transmitting elastic member 22 and the outer hub 23. The inner hub 21 has a substantial cylindrical shape and its inner peripheral surface 21d fits to the outer peripheral surface of the torque limiter 26 and has a fitting portion 21d that fits to the outer peripheral surface (fitting portion) 26e of the large outer diameter portion 26a of the torque limiter 26. In this embodiment, the fitting portion 21d of the inner hub 21 and the fitting portion 26e of the torque limiter 26 are shaped into the hexagonal shape as shown in FIG. 3. Both fitting portions 26e and 21d may be shaped into male and female screw portions for screw meshing. In this way, the inner hub 21 and the torque limiter 26 are fixed to each other by fitting. The rear side distal end surface 21e of the inner hub 21 comes into contact with the washer 8. Consequently, the inner hub 21 is clamped by the torque limiter 26 and the washer 8. The outer peripheral surface of the inner hub 21 is coupled with the torque transmitting elastic member 22 by bonding, or the like.

The outer hub 23 has a cylindrical shape and is formed of a metallic material such as iron in the same way as the inner hub 21.

The torque transmitting elastic member 22 is formed of an elastic material such as a rubber or a resin, is inserted between and held by the inner hub 21 and the outer hub 23 and is bonded to the outer peripheral surface of the inner hub 21 and to the inner peripheral surface of the outer hub 23 by means such as bonding. Alternatively, these three members may be formed integrally with one another by insert molding. This elastic member 22 operates not only as the torque transmitting member but also as a torque damper.

The torque transmitting elastic member 22 extends in such a fashion as to encompass a substantial half of the outer hub 23 on the rear side as shown in FIGS. 22 and 23, and its three surfaces (outer peripheral surfaces), that is, upper surface, side surface and lower surface, have a concavo-convex shape and form the hub side engagement portion 24. In this case, all the three surfaces need not always have the concavo-convex shape and the surface of any one or two of them may have the concavo-convex shape. This concavo-convex shape is constituted by involute-spline or trochoide.

The hub side engagement portion 24 has a ring-like shape as a whole but does not have a perfect ring as shown in FIG. 23 and a plurality of slits 25 is formed at predetermined intervals among them in the circumferential direction. These slits 25 are formed in such a fashion as to correspond to reinforcing portions (reinforcing ribs: not shown) disposed on the pulley side.

In the explanation given above, the hub 2 is constituted by the three members of the inner hub 21, the torque transmitting elastic member 22 and the outer hub 23 but may be constituted by two members of the inner hub 21 and the torque transmitting elastic member 22 by omitting the outer hub 23.

On the other hand, a pocket portion 11 as a ring-like recess portion for accepting the hub side engagement portion 24 is formed on the end face of the pulley 1 on the front side. The three surfaces of the pocket portion 11 are formed into the concavo-convex shape in such a fashion as to correspond to the concavo-convex engagement portion 24 and to thereby form a pulley side engagement portion 12. In this case, too, all the three surfaces of the pulley side engagement portion 12 need not have the concavo-convex shape but the concavo-convex shape may be formed on only the surface or surfaces corresponding to those of the hub side engagement portion 24. This concavo-convex shape is constituted by involute-spline or trochoide, too.

As the hub side engagement portion 24 is inserted into the pocket portion 11 of the pulley 1 in this way, the hub side engagement portion 24 and the pulley side engagement portion 12 fit to each other through concavo-convex engagement and the hub 2 and the pulley 1 are coupled.

Among the concavo-convex fitting portions of the hub side engagement portion 24 and the pulley side engagement portion 12 constituted as described above, the concavo-convex fitting portions existing on the more outer peripheral side than the outer hub 23 are exposed on their front side to the outside. Therefore, foreign matters such as dust and liquid are likely to invade into the concavo-convex portion and the concavo-convex portions are likely to undergo abnormal wear.

In the tenth embodiment, therefore, a ring-like dust invasion prevention portion 28 protruding outward in the radial direction from a portion on the front side that is adjacent to the hub side engagement portion 24 of the torque transmitting elastic member 22 is disposed to prevent exposure of the concavo-convex fitting portion to the outside. This dust invasion prevention portion 28 is formed integrally with the torque transmitting elastic member 22 and when its outer peripheral end comes into contact with the inner peripheral surface (seal surface) 1a of the pulley 1, the front surface of the concavo-convex fitting portion is completely covered.

Because the dust invasion prevention portion 28 is disposed in this way, it is possible to prevent foreign matters such as dust and liquid from entering the concavo-convex fitting portion and abnormal wear at this portion.

When the hub side engagement portion 24 on the side of the hub 2 is shaped from the elastic member into the concavo-convex shape, fins occur and owing to the removing step of the flashes, the number of man-hour increases, thereby inviting the increase of the production cost. Because the dust invasion prevention portion 26 is disposed, however, this deflashing step can be simplified, the number of man-hour can be decreased and the increase of the cost of production can be suppressed advantageously.

Figure 24:
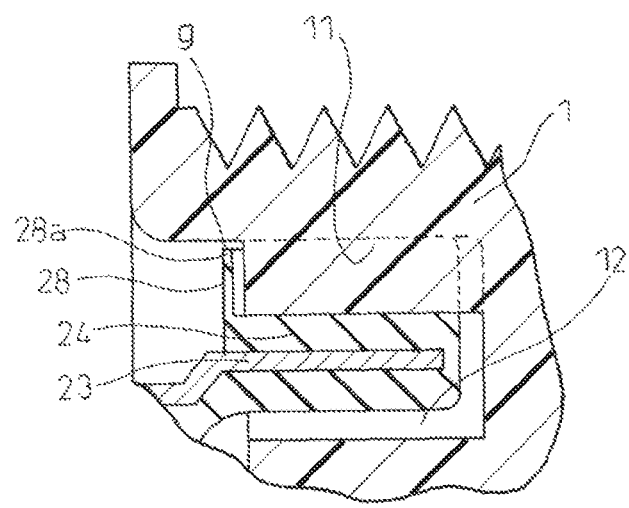
FIG. 24 is an enlarged view of main portions of an eleventh embodiment of the invention.

FIG. 24 shows the eleventh embodiment of the invention. In this eleventh embodiment, the outer peripheral edge 28a of the dust invasion prevention portion 28 does not keep contact with the inner peripheral surface 1a of the pulley 1 but a small clearance g is formed. When such a small clearance g is formed, too, invasion of foreign matters to a certain extent into the concavo-convex fitting portion can be sufficiently prevented. The rest of the constructions are the same as those of the first embodiment and the explanation will be omitted to avoid overlapping.

Figure 25:
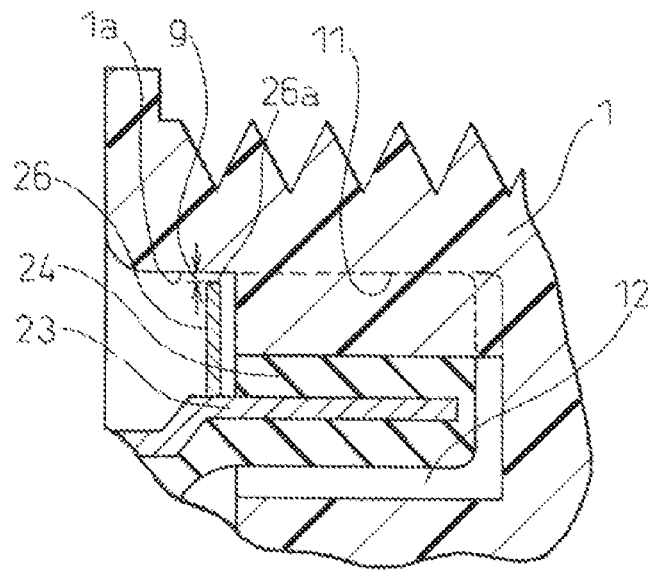
FIG. 25 is an enlarged view of main portions of a twelfth embodiment of the invention.

FIG. 25 shows the twelfth embodiment of the invention. In the tenth and eleventh embodiments, the dust invasion prevention portion 28 is formed integrally with the torque transmitting elastic member 22 but in this twelfth embodiment, the dust invasion prevention portion 28 is formed separately from the torque transmitting elastic member 2 and a small clearance g is formed between its outer peripheral end 28a and the inner peripheral surface 1a of the pulley 1. In this case, too, invasion of foreign matters to a certain extent can be prevented, though not perfectly. The rest of the constructions are the same as those of the first embodiment and the explanation will be omitted.

Figure 26:
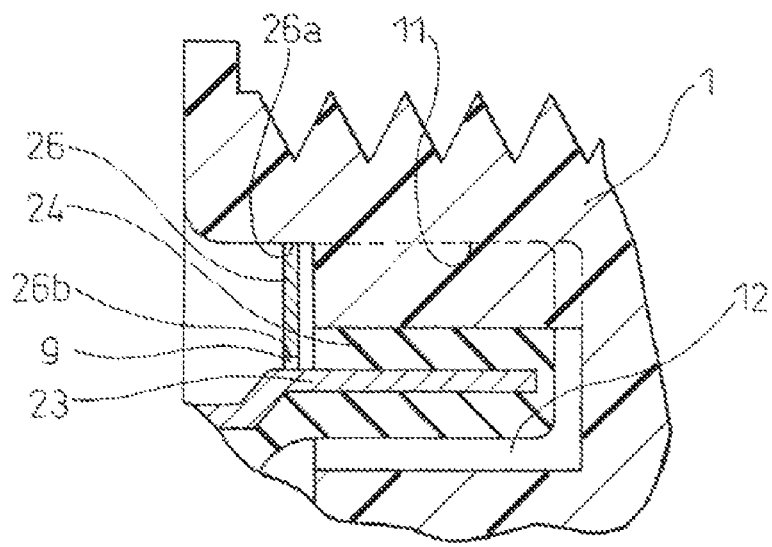
FIG. 26 is an enlarged view of main portions of a thirteenth embodiment of the invention.

FIG. 26 shows the thirteenth embodiment of the invention. In this thirteenth embodiment, the dust invasion prevention portion 28 is formed separately in the same way as in the twelfth embodiment but its outer peripheral end 28a keeps contact with the inner peripheral surface 1a of the pulley 1. A small clearance g is formed between the inner peripheral end 28b and the outer hub 23. When the dust invasion prevention member 28 is formed separately as in the twelfth and thirteenth embodiments, methods of installing the dust invasion prevention member 28 include a method that uses fixing members such as bolts and rivets besides means such as bonding and press-in.

The foregoing explanation has been given on the power transmission device having the construction in which the hub 2 is fixed to the rotary shaft 4 through the torque limiter 3 but the dust invasion prevention member of the invention can be naturally applied to a power transmission device having a construction in which a torque limiter is provided to a rotary shaft and a hub is directly fixed to the rotary shaft.

While the invention has been described by reference to specific embodiments chosen for purposes of illustration, it should be apparent that numerous modifications could be made thereto, by those skilled in the art, without departing from the basic concept and scope of the invention.

The invention claimed is:

1. A power transmission device comprising:
   a pulley rotatably fitted to a housing; and
   a hub adapted to a fit a distal end portion of a rotary shaft protruding outside from said housing, wherein the hub rotates integrally with said rotary shaft, and said hub includes an inner hub fixed to said rotary shaft and arranged inside a torque transmitting elastic member, an outer hub, which is arranged outside said torque transmitting elastic member and is interconnected to a front end face of said pulley, wherein:
   said torque transmitting elastic member is interposed between said inner hub and said outer hub and held by said inner and outer hubs,
   the hub includes a hub side engagement portion formed of an elastic material such as rubber or a resin and disposed on either one, or both, of an inner peripheral surface side and an outer peripheral surface side of said outer hub,
   the pulley includes a pulley side engagement portion disposed at a position corresponding to said outer hub on the front end face of said pulley,
   the hub side engagement portion and the pulley side engagement portion engage with each other to thereby form a torque transmission structure between said hub and said pulley,
   the pulley is made of a resin material,
   an annular concavity is formed in a front surface of the pulley,
   the annular concavity receives the hub-side engagement portion,
   the annular concavity has an annular inner surface, an annular outer surface, which is radially outward of the inner surface, and a bottom surface, which extends between a rear end of the inner surface and a rear end of the outer surface,
   a pulley side engagement portion is provided on at least one of the surfaces of the annular concavity,
   strength reinforcing ribs are located on the bottom of the annular concavity and extend continuously from the inner surface to the outer surface of the annular concavity,
   a plurality of slits are located on the hub side engagement portion and are spaced apart from one another in a circumferential direction of the hub side engagement portion,
   each of the slits extends in an axial direction of the power transmission device from a rear end to a front end of the annular concavity,
   each of the strength reinforcing ribs extends in an axial direction and is located on the bottom surface of the annular concavity in a fashion to correspond with the slits,
   the pulley side engagement portion and the hub side engagement portion are assembled such that the strength reinforcing ribs are engaged with the slits in the axial direction, and
   each of the strength reinforcing ribs includes first and second peripheral side faces that respectively contact the hub side engagement portion in the axial direction.

2. A power transmission device according to claim 1, wherein said hub side engagement portion and said pulley side engagement portion have a concavo-convex shape such as an involute spline shape or a trochoidal shape.

3. A power transmission device according to claim 1, wherein said hub side engagement portion and said pulley side engagement portion have a fitting structure.

4. A power transmission device according to claim 1, wherein said hub side engagement portion is arranged on said outer hub by integral molding or bonding.

5. A power transmission device according to claim 1, wherein said hub side engagement portion constitutes a part of said torque transmitting elastic member.

6. A power transmission device according to claim 1, wherein at least one of the first or second hub side engagement portion of said hub side engagement portion and the inner or outer surface of the annular concavity of said pulley is formed substantially into taper shape.

7. A power transmission device according to claim 1, wherein said outer hub is an outer ring separate from said hub side engagement portion.

8. A power transmission device according to claim 7, wherein an entire surface of said outer ring is covered with an elastic material such as rubber or a resin forming said torque transmitting elastic member or said hub side engagement portion.

9. A power transmission device according to claim 7, wherein a reinforcing portion protruding to inside of said hub side engagement portion is arranged on said outer ring.

10. A power transmission device according to claim 7, wherein said outer ring is formed of metal.

11. A power transmission device according to claim 10, wherein said hub side engagement portion is more offset towards a root side of said rotary shaft in comparison with said torque transmitting elastic member, and said metal outer ring is so formed as to be pushed from a diametric direction.

12. A power transmission device according to claim 7, wherein said hub side engagement portion is more offset towards a root side of said rotary shaft in comparison with said torque transmitting elastic member, and a balancer weight fitted to said inner hub or to said rotary shaft is arranged on the front side of said hub side engagement portion.

13. A power transmission device according to claim 2, wherein a maximum width HW of each convex portion of said hub side engagement portion is set to be at least equal to or not less than a maximum width PW of each convex portion of said pulley side engagement portion.

14. A power transmission device according to claim 2, wherein a gap g of at least equal to or not less than 0.001 mm is disposed between a distal end portion of said convex portion of said hub side engagement portion and a bottom portion of said concave portion of said pulley side engagement portion.

15. A power transmission device according to claim 2, wherein an R1 portion and an R2 portion are formed on both sides of the bottom portion of said concave portion of said hub side engagement portion, and said R1 portion on the side of a rotating direction has an R shape having a greater diameter than said R2 portion on the side of a counter-rotating direction.

16. A power transmission device according to claim 2, wherein the side surface of each convex portion of said hub side engagement portion and the side surface of each concave portion of said pulley side engagement portion keep mutual contact and form a torque transmission surface TF, and said torque transmission surface TF is arranged on a normal NL of said pulley.

17. A power transmission device according to claim 16, wherein said torque transmission surface TF is deviated by a predetermined angle from said normal NL in the rotating direction of said pulley.

18. A power transmission device according to claim 2, wherein the side surface of each convex portion of said pulley side engagement portion and the side surface of each concave portion of said hub side engagement portion keep mutual contact and form a torque transmission surface TF, and said torque transmission surface TF on the rotating side of each convex portion of said pulley side engagement portion and said torque transmission surface TF on the side of the counter-rotating direction are substantially parallel to each other.

19. A power transmission device according to claim 1, wherein a material having a low coefficient of friction is disposed on the surface of said hub side engagement portion by bonding, coating or surface treatment.

20. A power transmission device according to claim 1, wherein said hub side engagement portion formed at a part of said torque transmitting elastic member and said pulley side engagement portion formed on said pulley fit to each other in concavo-convex engagement and form a concave-convex fitting portion, and a ring-like dust invasion prevention portion is so arranged as to cover a front surface of said concavo-convex fitting portion.

21. A power transmission device according to claim 20, wherein a part of said torque transmitting elastic member is so arranged as to wrap a rear side portion of said outer hub and its outer surface is formed into a concavo-convex shape to thereby form said hub side engagement portion.

22. A power transmission device according to claim 20, wherein said dust invasion prevention portion is formed integrally with said torque transmitting elastic member.

23. A power transmission device according to claim 20, wherein said dust invasion prevention portion is arranged on the side of said torque transmitting elastic member and a small clearance (g) is disposed between said dust invasion prevention portion and said pulley.

24. A power transmission device according to claim 20, wherein said dust invasion prevention portion is disposed on the side of said pulley and a small clearance (g) is disposed between said torque transmitting elastic member and said dust invasion prevention portion.

25. A power transmission device according to claim 1, wherein each of the ribs is fitted between sections of the hub side engagement portion that are circumferentially spaced apart from one another.

26. A power transmission device according to claim 1, wherein the slits are formed from a rear end of the annular concavity to a bottom surface of the annular concavity.

27. A power transmission device according to claim 1, wherein each of the slits extends axially in a rearward direction from the outer hub.

28. A power transmission device comprising:
a pulley rotatably fitted to a housing; and
a hub adapted to fit a distal end portion of a rotary shaft, which protrudes from the housing, wherein the hub rotates integrally with the rotary shaft, and the hub includes:
an inner hub, which is fixed to the rotary shaft and arranged inside a torque transmitting elastic member;
an outer hub, which is arranged outside the torque transmitting elastic member and is interconnected to a front end face of the pulley, wherein the torque transmitting elastic member is located between the inner hub and the outer hub and is held by the inner and outer hubs; and
a hub side engagement portion formed of an elastic material and located on either one, or both, of an inner peripheral surface side and an outer peripheral surface side of the outer hub, wherein:
the hub side engagement portion is made of material that is different from that of the outer hub,
the hub side engagement portion is located outside of the outer hub,
the pulley includes a pulley side engagement portion located at a position corresponding to the outer hub on the front end face of the pulley,
the pulley side engagement portion and the hub side engagement portion are engaged with each other to form a torque transmission structure between the hub and the pulley,
the pulley is made of a resin material,
an annular concavity is formed in a front surface of the pulley,
the annular concavity receives the hub-side engagement portion,
the annular concavity has an annular inner surface, an annular outer surface, which is radially outward of the inner surface, and a bottom surface, which extends between a rear end of the inner surface and a rear end of the outer surface,
a pulley side engagement portion is provided on at least one of the surfaces of the annular concavity,
strength reinforcing ribs are located on the bottom of the annular concavity and extend continuously from the inner surface to the outer surface of the annular concavity,
a plurality of slits are located on the hub side engagement portion and are spaced apart from one another in a circumferential direction of the hub side engagement portion,
the pulley side engagement portion and the hub side engagement portion are assembled such that the strength reinforcing ribs are engaged with the slits; and
each of the strength reinforcing ribs includes first and second peripheral side faces that respectively contact the hub side engagement portion in the axial direction.

29. A power transmission device according to claim 28, wherein each of the ribs is fitted between sections of the hub side engagement portion that are circumferentially spaced apart from one another.

* * * * *